US012304369B2

(12) United States Patent
Muck et al.

(10) Patent No.: US 12,304,369 B2
(45) Date of Patent: May 20, 2025

(54) KINETIC SEAT ASSEMBLIES HAVING DAMPERS FOR FIXED COMPONENTS AND MOVABLE COMPONENTS INCLUDING LATERAL DAMPING MECHANISMS AND FLUID RESERVOIRS

(71) Applicants: Toyota Motor Engineering & Manufacturing North America, Inc., Plano, TX (US); Stabilus GMBH, Koblenz (DE)

(72) Inventors: Todd Rupert Muck, Fowlerville, MI (US); Charles P. Patterson, New Boston, MI (US); Peter J. Moegling, Whitmore Lake, MI (US); Matthew R. Speck, Plymouth, MI (US); Leon T. Toma, Commerce Township, MI (US); Raphael Piroth, Heidenrod (DE); Lars Löhken, Linz am Rhein (DE); Yashodhan Joshi, Rochester Hills, MI (US)

(73) Assignees: TOYOTA MOTOR ENGINEERING & MANUFACTURING NORTH AMERICA, INC., Plano, TX (US); STABILUS GMBH, Koblenz (DE)

( * ) Notice: Subject to any disclaimer, the term of this patent is extended or adjusted under 35 U.S.C. 154(b) by 344 days.

(21) Appl. No.: 17/873,703

(22) Filed: Jul. 26, 2022

(65) Prior Publication Data
US 2023/0036617 A1  Feb. 2, 2023

Related U.S. Application Data

(60) Provisional application No. 63/227,172, filed on Jul. 29, 2021.

(51) Int. Cl.
B60N 2/52 (2006.01)
B60N 2/50 (2006.01)
(Continued)

(52) U.S. Cl.
CPC ............. B60N 2/525 (2013.01); B60N 2/504 (2013.01); B60N 2/914 (2018.02); F16F 9/065 (2013.01);
(Continued)

(58) Field of Classification Search
CPC .......... B60N 2/52; B60N 2/522; B60N 2/525; B60N 2/527; B60N 2/028; B60N 2/68;
(Continued)

(56) References Cited

U.S. PATENT DOCUMENTS 3,140,118 A * 7/1964 Dorn ...................... B60N 2/507
297/285
4,150,805 A * 4/1979 Mazelsky .............. B64D 25/04
297/216.1
(Continued)

FOREIGN PATENT DOCUMENTS

EP 3275725 A1 10/2018
JP 05269029 A 10/1993
(Continued)

OTHER PUBLICATIONS

ISR & WO for International Application No. PCT/EP2022/070922 published as WO2023/006734A1 dated Nov. 11, 2022.

Primary Examiner — Syed A Islam
(74) Attorney, Agent, or Firm — Dinsmore & Shohl LLP

(57) ABSTRACT

A kinetic seat assembly includes a primary seat cushion frame, a secondary seat cushion frame movable relative to the primary seat cushion frame, a primary seat back frame, a secondary seat back frame movable relative to the primary seat back frame, a pair of lateral dampers extending between the primary seat back frame and the secondary seat back frame, a pair of vertical dampers extending between the secondary seat back frame and the primary seat cushion frame, a pair of fluid reservoirs for providing a fluid into the
(Continued)

pair of lateral dampers and the pair of vertical dampers, and an electronic control unit configured to control the rate at which the fluid is provided to and drawn out of each of the dampers to control a damping effect. In embodiments, an end of the lateral dampers is permitted to move freely relative to the secondary seat back frame.

27 Claims, 17 Drawing Sheets

(51) Int. Cl.
    *B60N 2/90*     (2018.01)
    *F16F 9/06*     (2006.01)
    *F16F 9/32*     (2006.01)
    *F16F 9/43*     (2006.01)
    *F16F 9/516*     (2006.01)
    *F16F 15/027*     (2006.01)
    *B60N 2/02*     (2006.01)
    *B60N 2/427*     (2006.01)
    *B64D 25/04*     (2006.01)

(52) U.S. Cl.
CPC ............ *F16F 9/067* (2013.01); *F16F 9/3214* (2013.01); *F16F 9/3235* (2013.01); *F16F 9/43* (2013.01); *F16F 9/516* (2013.01); *F16F 15/0275* (2013.01); *B60N 2/028* (2013.01); *B60N 2/42718* (2013.01); *B64D 25/04* (2013.01); *F16F 2222/12* (2013.01); *F16F 2228/066* (2013.01); *F16F 2230/06* (2013.01); *F16F 2230/18* (2013.01); *F16F 2230/42* (2013.01)

(58) Field of Classification Search
CPC .............. B60N 2/4263; B60N 2/42718; B60N 2/42763; B60N 2/914; B64D 25/04
See application file for complete search history.

(56) References Cited

U.S. PATENT DOCUMENTS

| | | | |
|---|---|---|---|
| 4,423,848 A | | 1/1984 | Mazelsky |
| 4,909,488 A | | 3/1990 | Seibert et al. |
| 5,758,859 A | * | 6/1998 | Gonzalez ............... B60N 2/505 248/420 |
| 6,663,089 B2 | | 12/2003 | Kitaura |
| 8,308,236 B2 | | 11/2012 | Ishimoto et al. |
| 11,084,403 B1 | | 8/2021 | Muck et al. |
| 2012/0091773 A1 | | 4/2012 | Lorey |
| 2018/0072187 A1 | | 3/2018 | Katoh et al. |
| 2018/0162188 A1 | | 6/2018 | Chikamatsu et al. |
| 2021/0237629 A1 | | 8/2021 | Muck et al. |
| 2021/0237631 A1 | | 8/2021 | Muck et al. |

FOREIGN PATENT DOCUMENTS

| | | |
|---|---|---|
| JP | 5286918 B2 | 9/2013 |
| JP | 2015037942 A | 2/2015 |

* cited by examiner

KINETIC SEAT ASSEMBLIES HAVING DAMPERS FOR FIXED COMPONENTS AND MOVABLE COMPONENTS INCLUDING LATERAL DAMPING MECHANISMS AND FLUID RESERVOIRS

CROSS-REFERENCE TO RELATED APPLICATION

This application claims the priority benefit of U.S. Provisional Patent Application No. 63/227,172, filed Jul. 29, 2021, for "Dampers for Seat Assembly Having Fixed Frame And Movable Seat Cushion And Seat Back," which is hereby incorporated by reference in its entirety including the drawings.

TECHNICAL FIELD

The present specification generally relates to kinetic assemblies for vehicles and, more specifically, kinetic assemblies for vehicles that accommodate rotation of an occupant's body during turning operations with a force applied in a counter-turning direction.

BACKGROUND

When driving a vehicle, the driver typically experiences fatigue due to repeated rotation of the driver's torso and pelvis. In addition, a driver's knees and head are also rotated during turning of the vehicle. Thus, this movement requires the driver to continuously compensate for rotation during turning. Over time, this rotation of the driver's torso, pelvis, knees, and head can lead to various aches and pains limiting the amount of driving time one can withstand.

It has been known to provide a seat assembly including a seat back and a seat cushion that mimic the walking movement of an occupant's pelvis and torso. Specifically, the known seat assembly allows the seat cushion to pivot at a cushion pivot axis and the seat back to pivot at a seat back pivot axis such that the seat back and the seat cushion pivot in opposite directions. However, rotating the pelvis and the torso in opposite directions during turning may cause discomfort in some drivers.

Accordingly, a need exists for alternative kinetic seat assemblies that offer torso rotation and pelvic rotation in the same direction to maintain a centered position of the driver's head and knees. Additionally, a need exists for alternative kinetic seat assemblies in which movement of a movable seat back and a movable seat cushion in a vertical direction and a lateral direction may be controlled.

SUMMARY

In one embodiment, a kinetic seat assembly includes: a primary seat back frame; a secondary seat back frame; and a lateral damping mechanism including a first lateral damper and a second lateral damper, the first lateral damper and the second lateral damper extending between the primary seat back frame and the secondary seat back frame, a first end of the first lateral damper and the second lateral damper is rotatably fixed to the primary seat back frame and an opposite second end of the first lateral damper and the second lateral damper is permitted to move freely through a hole formed in a respective flange extending from the secondary seat back frame.

In another embodiment, a kinetic seat assembly includes: a primary seat cushion frame; a secondary seat cushion frame movable relative to the primary seat cushion frame; a primary seat back frame; a secondary seat back frame movable relative to the primary seat back frame; a pair of lateral dampers extending between the first upper component and the secondary seat back frame; and a first fluid reservoir for providing a fluid into the pair of lateral dampers, the fluid reservoir operable to control a rate at which fluid is provided to and drawn out of the pair of lateral dampers to control a damping effect.

In yet another embodiment, a kinetic seat assembly includes: a primary seat cushion frame; a secondary seat cushion frame pivotally coupled to the primary seat cushion frame; a primary seat back frame; a secondary seat back frame pivotally coupled to the primary seat back frame; a pair of vertical dampers extending between the secondary seat back frame and the primary seat cushion frame; and a fluid reservoir for providing a fluid into the pair of lateral dampers to control a rate at which fluid is provided to and drawn out of the pair of vertical dampers.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
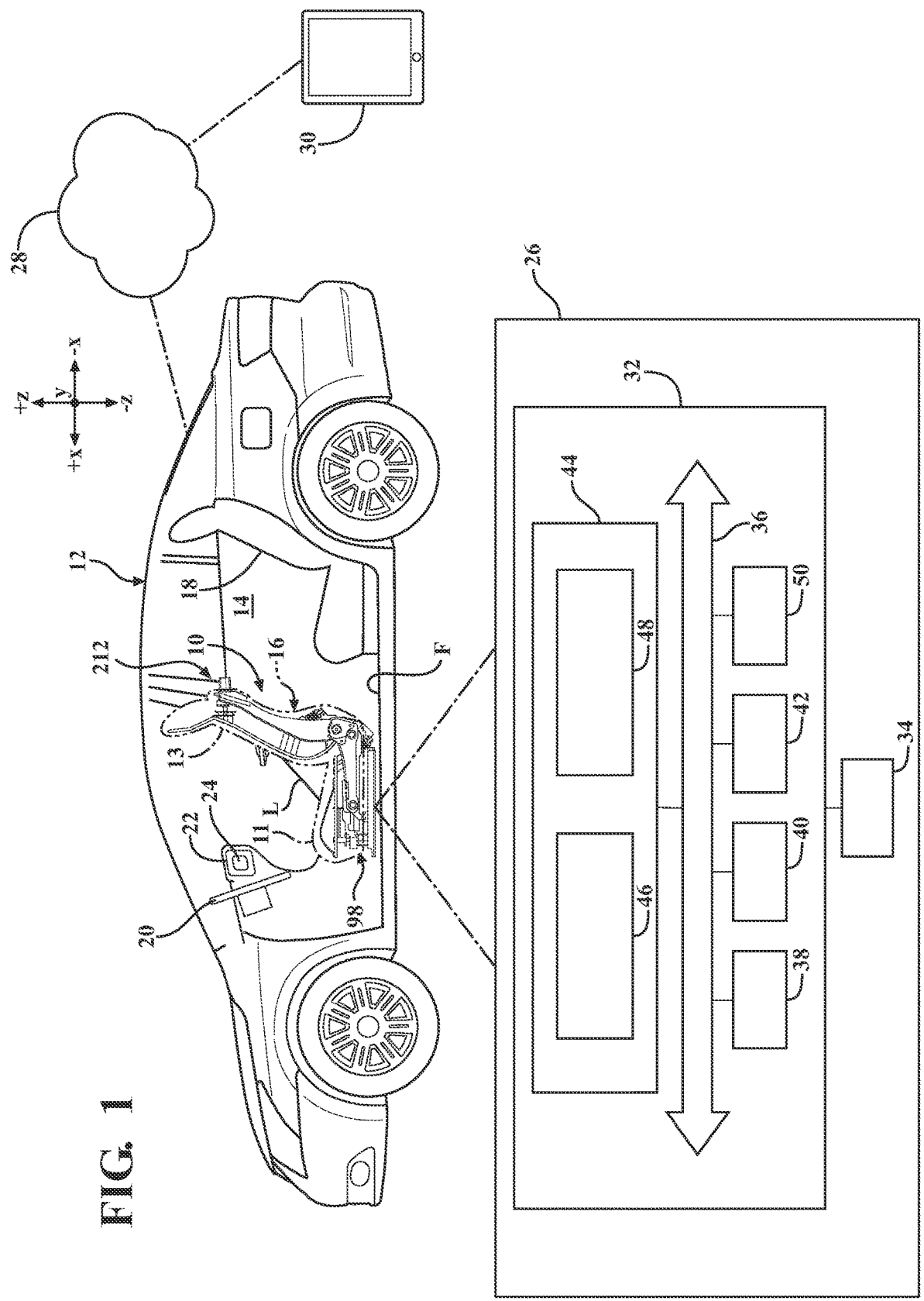
FIG. 1 schematically depicts a system for a vehicle having kinetic seat assembly, according to one or more embodiments shown and described herein, and illustrated in a vehicle as a driver's seat.
Figure 2:
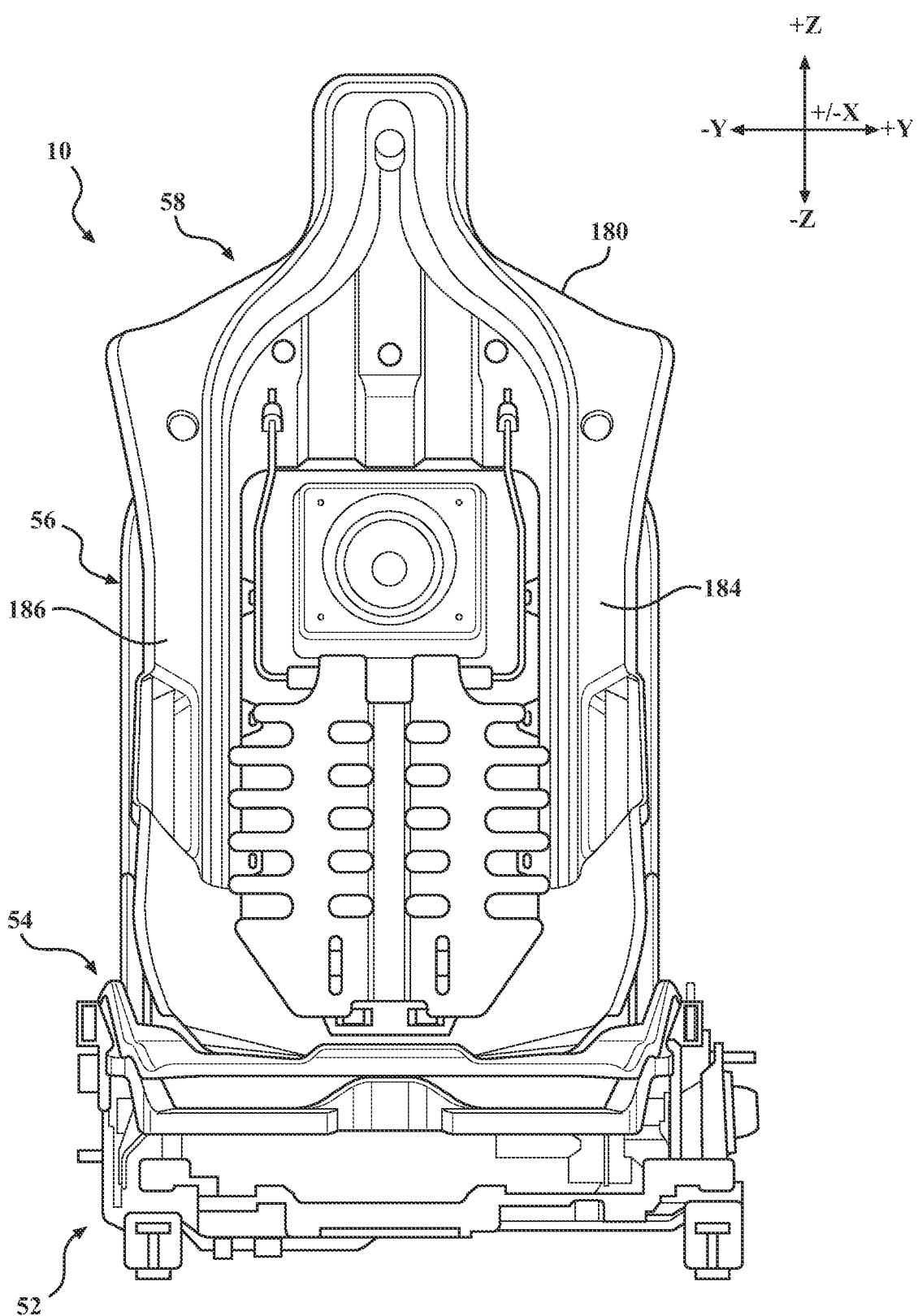
FIG. 2 schematically depicts a front view of the kinetic seat assembly of FIG. 1, according to one or more embodiments shown and described herein.
Figure 3:
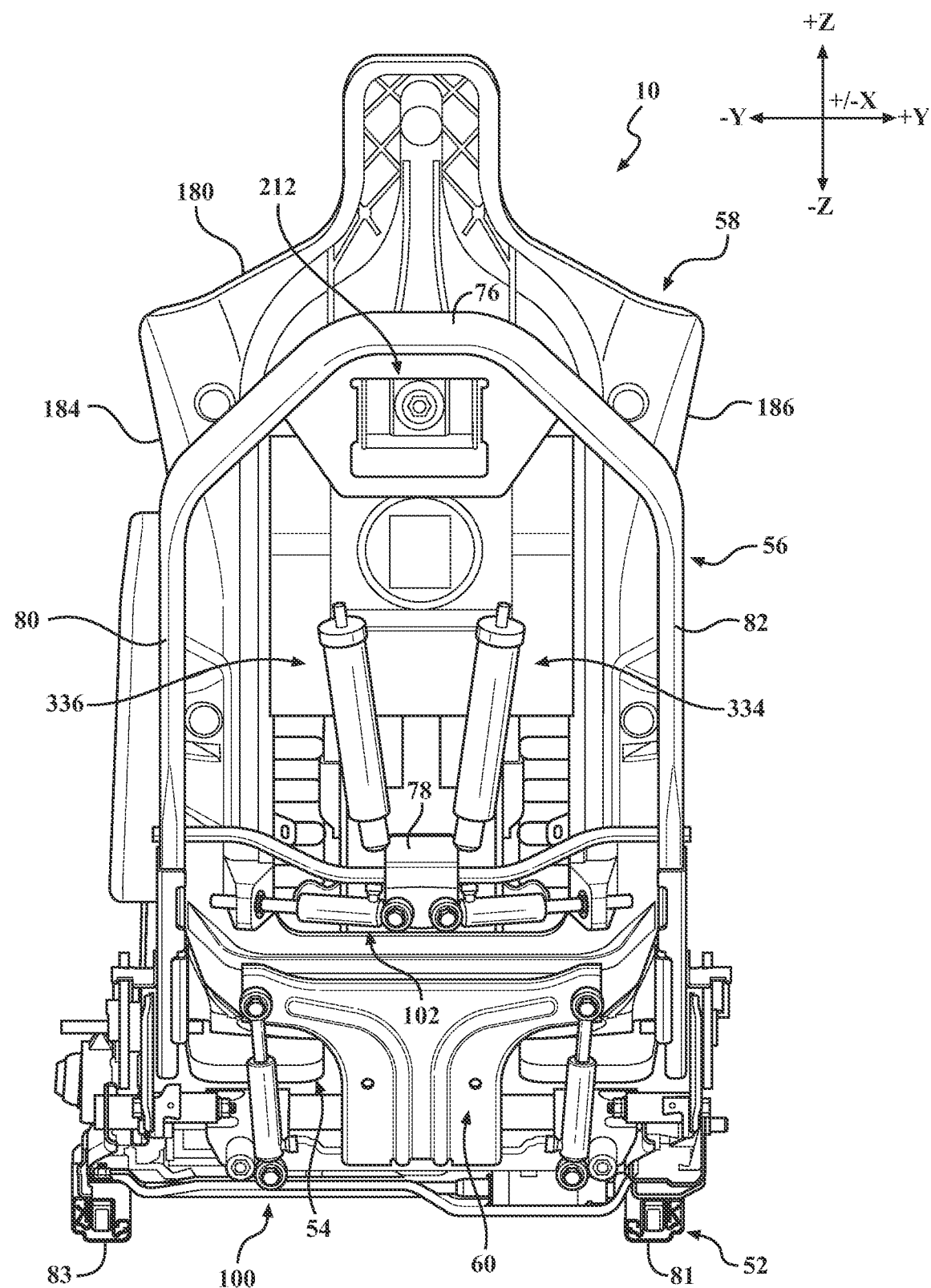
FIG. 3 schematically depicts a rear view of the kinetic seat assembly of FIG. 1, according to one or more embodiments shown and described herein.
Figure 4:
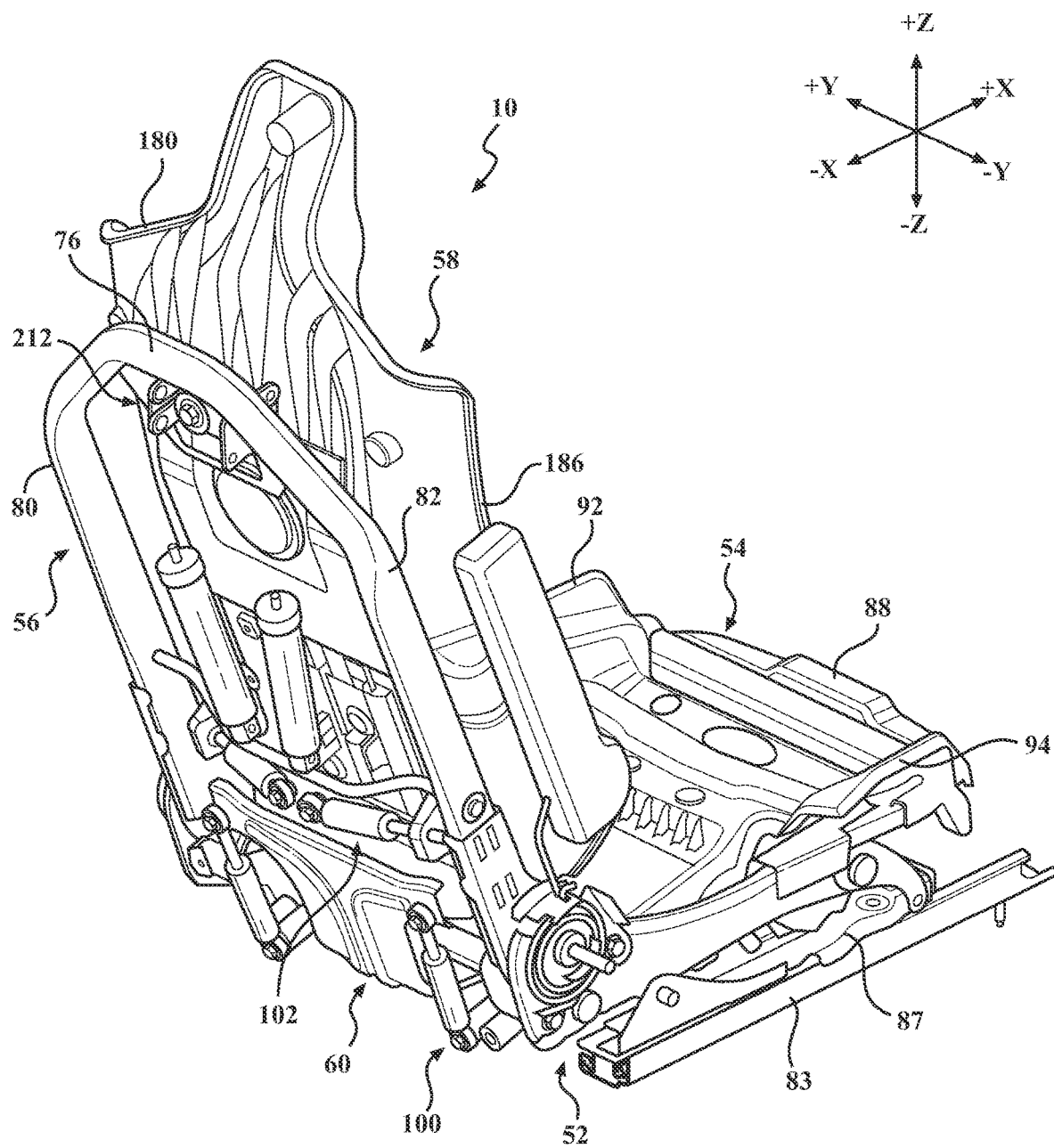
FIG. 4 schematically depicts a rear perspective view of the kinetic seat assembly of FIG. 1, according to one or more embodiments shown and described herein.
Figure 5:
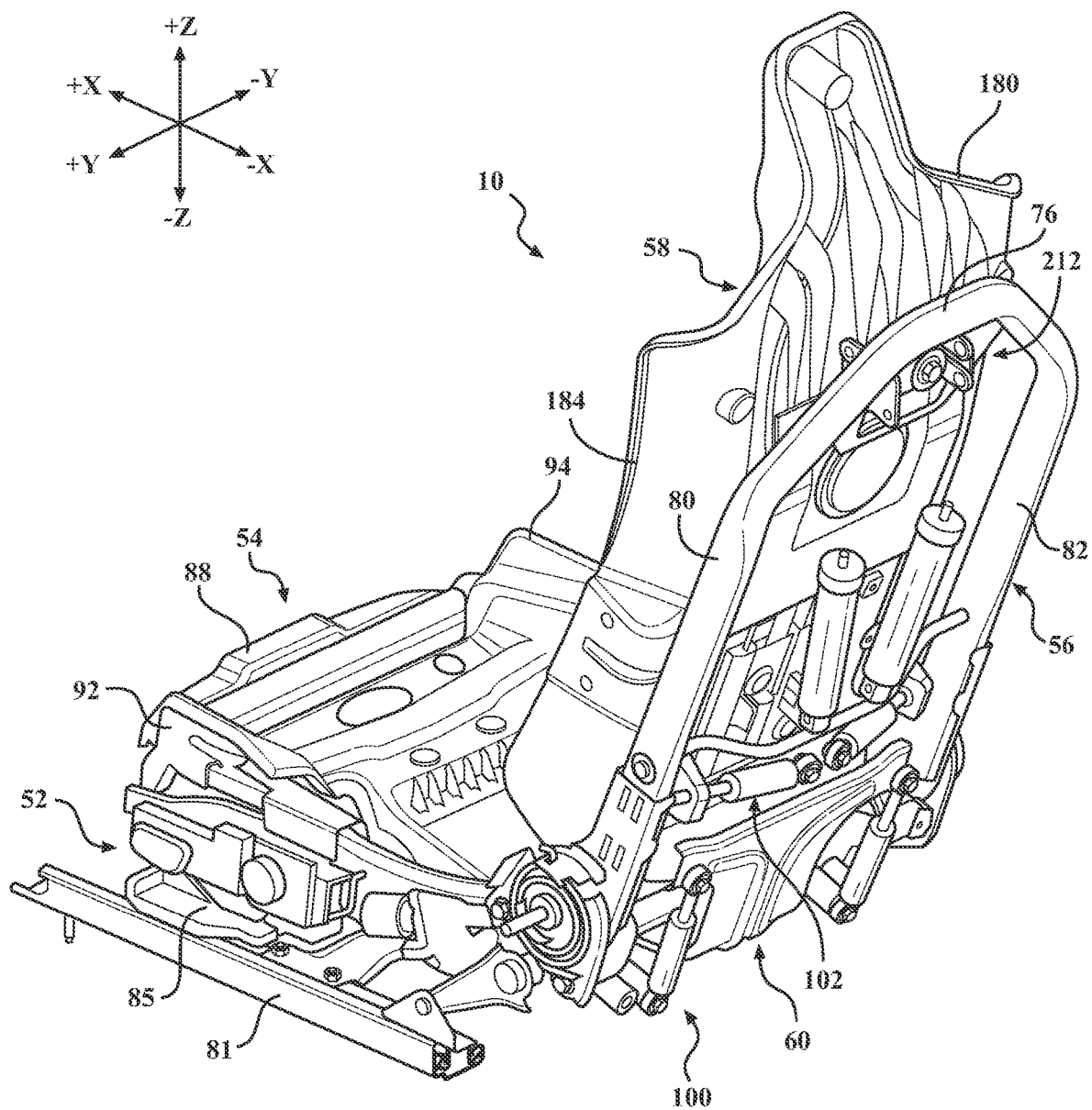
FIG. 5 schematically depicts another rear perspective view of the kinetic seat assembly of FIG. 1, according to one or more embodiments shown and described herein.

FIG. 1 generally depicts an environmental view of an embodiment of a vehicle including a kinetic seat assembly. The vehicle general comprises a passenger compartment which passengers or other occupants occupy. A plurality of vehicle seats including a front driver seat, front passenger seat, and one or more rear passenger seats may be provided within the passenger compartment of the vehicle.

As shown, the kinetic seat assembly is utilized as the driver's seat. However, it is to be understood that a plurality of kinetic seat assemblies may be utilized as multiple seats of the vehicle. The kinetic vehicle seat assembly generally comprises a kinetic seat cushion assembly, a kinetic seat back assembly, a vertical damping mechanism, and a lateral damping mechanism. The kinetic seat cushion assembly includes a primary seat cushion frame, a secondary seat cushion frame, and a front pivot mechanism that pivotally couples a front portion of the primary seat cushion frame to a front portion of the secondary seat cushion frame. The kinetic seat back assembly includes a primary seat back frame, a secondary seat back frame, and an upper pivot mechanism that pivotally couples an upper portion of the primary seat back frame to an upper portion of the secondary seat back frame.

The vertical damping mechanism provides a damping effect as the secondary seat cushion frame and the secondary seat back frame move in a vehicle vertical direction. The lateral damping mechanism provides a damping effect as a rear end of the secondary seat cushion frame and a lower end of the secondary seat back frame move in a vehicle lateral direction. The front pivot mechanism allows the secondary seat cushion frame to rotate with respect to the primary seat cushion frame. Similarly, the upper pivot mechanism allows the secondary seat back frame to rotate, and in some embodiments move in the vehicle vertical direction, with respect to the primary seat back frame.

During a turning operation, the occupant and the kinetic seat assembly receive a force pushing the occupant and the kinetic seat assembly in an opposite direction of the turning operation. Thus, the pivot mechanisms and the vertical and lateral damping mechanisms cause the secondary seat cushion frame and the secondary seat back frame to rotate in the direction of the force and in phase with one another. As used herein, the term "in phase" describes two objects, for example, the secondary seat cushion frame and the secondary seat back frame, moving synchronously with one another in the same direction. As such, the term "out of phase" as used herein describes two objects, for example, the secondary seat cushion frame and the secondary seat back frame, not moving synchronously and in the same direction with one another. Further, it should be understood that when two objects are moving in phase with one another, the directions in which those object are moving are similarly in phase with one another.

In some embodiments, the upper pivot mechanism and the damping mechanisms are adjustable, either manually or electronically, in order to increase or decrease the amount of movement of the secondary seat cushion frame and/or the secondary seat back frame.

In some embodiments, the vehicle includes a display unit and a user interface. The vehicle also includes an onboard computing device including an electronic control unit having a processor and a memory component. Thus, the pivot mechanisms and the damping mechanisms may be operable by an occupant of the vehicle by operating controls on the user interface. In some embodiments, the electronic control unit also includes a network interface hardware configured to interface with a transceiver to connect to a network. The network couples the vehicle to a mobile computing device in order to allow an occupant to control the pivot mechanisms and the damping mechanisms wirelessly.

As used herein, the term "vehicle longitudinal direction" refers to the forward-rearward direction of the vehicle (i.e., in the +/−vehicle X direction depicted in FIG. 1). The term "vehicle lateral direction" refers to the cross-vehicle direction (i.e., in the +/−vehicle Y direction depicted in FIG. 1), and is transverse to the vehicle longitudinal direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axis shown in the drawings. As used herein, "lower" and "below" are defined as the negative Z direction of the coordinate axis shown in the drawings. Further, the term "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard," and "outward" refer may be mirrored about the vehicle centerline when evaluating components positioned along opposite sides of the vehicle.

As used herein, the term "kinetic seat vertical direction" refers to the same direction as the vehicle vertical direction. In a configuration in which the kinetic seat assembly is a normal, front-facing seat in a vehicle, the term "kinetic seat longitudinal direction" refers to a direction parallel to the vehicle longitudinal direction. However, it should be appreciated that other configurations are contemplated in which the kinetic seat assembly is oriented in a direction in which the kinetic seat longitudinal direction is perpendicular, i.e., parallel to the vehicle lateral direction, or some other direction therebetween.

Also used herein, it is to be understood that the "turning direction" means a direction in which the occupant is turning the vehicle. Similarly, "counter-turning direction" means a direction opposite the turning direction.

Reference will now be made in detail to various embodiments of the kinetic seat assembly described herein, examples of which are illustrated in the accompanying drawings. Whenever possible, the same reference numerals will be used throughout the drawings to refer to the same or like parts.

Referring to FIG. 1, a vehicle is generally illustrated at 12. The vehicle 12 includes a passenger compartment 14 provided in an interior thereof. The passenger compartment 14 is a portion of an interior of the vehicle 12 which passengers or other occupants occupy. A plurality of vehicle seats including a driver seat 16, front passenger seat (not shown), and one or more rear passenger seats 18, such as second row passenger seats or third row passenger seats, are provided within the passenger compartment 14 of the vehicle 12.

In FIG. 1, the driver seat 16 is provided as a kinetic seat assembly 10. However, the kinetic seat assembly 10 is not limited to the driver seat 16. In embodiments, any one or any combination of the driver seat 16, the passenger seat, and the one or more rear passenger seats 18 may be provided as the kinetic seat assembly 10.

In FIG. 1, the vehicle 12 is provided as an automobile which includes coupes, sedans, minivans, trucks, crossovers, hybrids, and sports utility vehicles. However, the kinetic seat assembly 10 is not limited to automobiles. In embodiments, the kinetic seat assembly 10 may be provided in any vehicle 12 such as a watercraft, aircraft, or the like.

The vehicle 12 includes a steering wheel 20 located in front of the driver seat 16 in the vehicle longitudinal direction. The vehicle 12 includes a display unit 22 and a user interface 24. In some embodiments, the user interface 24 includes manual buttons or touchscreen controls provided on the display unit 22. It is appreciated, that the vehicle 12 in which the kinetic seat assembly 10 is provided may be an autonomous vehicle in which no steering wheel 20 is provided.

The vehicle 12 includes an onboard computing device 26. In some embodiments, a network 28 couples the vehicle 12 to a mobile computing device 30. The network 28 may include a wide area network, such as an internet or cellular network (such as 3G, 4G, 4G LTE, WiMAX, etc.). Similarly, the network 28 may include a local area network, such as a wireless fidelity (Wi-Fi) network, a Bluetooth network, a near field communication network, hardware, and the like.

The onboard computing device 26 of the vehicle 12 includes an electronic control unit 32. In some embodiments, the onboard computing device 26 includes a transceiver 34 in electrical communication with the electronic control unit 32 and configured for two way communication with the network 28 to couple the vehicle 12 to the network 28 and, thus, the mobile computing device 30.

The mobile computing device 30 may be configured as a mobile phone, a tablet, a personal computer, and/or other devices for performing the functionality described herein. The mobile computing device 30 may be operated by a third party such as a driver or other occupant or owner of the vehicle 12.

Still referring to FIG. 1, the electronic control unit 32 includes a local interface 36, a processor 38, an input/output hardware 40, a data storage component 42, and a memory component 44 coupled to the processor 38.

The local interface 36 is implemented as a bus or other communication interface to facilitate communication among the components of the electronic control unit 32. The local interface 36 is formed from any medium that is configured to transmit a signal. As non-limiting examples, the local interface 36 is formed of conductive wires, conductive traces, optical waveguides, or the like. The local interface 36 may also refer to the expanse in which electromagnetic radiation and their corresponding electromagnetic waves traverses. Moreover, the local interface 36 may be formed from a combination of mediums configured to transmit signals. In one embodiment, the local interface 36 comprises a combination of conductive traces, conductive wires, connectors, and buses that cooperate to permit the transmission of electrical data signals to and from the various components of the mobile computing device 30. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

The processor 38 may include processing components operable to receive and execute machine-readable instructions, such as those stored in the data storage component 42 and/or the memory component 44. As a non-limiting example, the processor 38 may be one of a shared processor circuit, dedicated processor circuit, or group processor circuit.

The input/output hardware 40 may refer to a basic input/output system (BIOS) that interacts with hardware of the vehicle 12, the mobile computing device 30, drivers that interact with particular devices of the vehicle 12 or the mobile computing device 30, one or more operating systems, user applications, background services, background applications, etc. In some embodiments, the input/output hardware 40 includes the display unit 22, the user interface 24, and/or the other hardware in the vehicle 12.

The data storage component 42 is communicatively coupled to the processor 38. As a non-limiting example, the data storage component 42 may include one or more database servers that support NoSQL, MySQL, Oracle, SQL Server, NewSQL, or the like. The data storage component 42 stores user-specific parameters and characteristics for desired operating modes of the kinetic seat assembly 10.

The memory component 44 is communicatively coupled to the processor 38. As a non-limiting example, the memory component 44 may be one of a shared memory circuit, dedicated memory circuit, or group memory circuit. The memory component 44 stores detection logic 46 and communication logic 48. The detection logic 46 and the communication logic 48 may each include a plurality of different pieces of logic, each of which may be embodied as a computer program, firmware, and/or software/hardware.

The detection logic 46 is executable by the processor 38 to detect one or more signals provided by the input/output hardware 40, such as the user interface 24. The communication logic 48 is executable by the processor 38 to cause the onboard computing device 26 to execute commands and operations corresponding to the detection logic 46. In some embodiments, the detection logic 46 and the communication logic 48 communicate with the network 28 through a network interface hardware 50 and/or the transceiver 34 to communicate with the mobile computing device 30.

In some embodiments, the memory component 44 is configured as volatile and/or nonvolatile memory and, as such, may include random access memory (SRAM, DRAM, and/or other types of RAM), flash memory, secure digital (SD) memory, registers, compact discs, digital versatile discs (DVD), and/or other types of non-transitory computer readable mediums. Depending on the particular embodiments, these non-transitory computer readable mediums may reside within the onboard computing device 26 and/or external to the onboard computing device 26. The memory component 44 and the data storage component 42 operate as the memory unit of the electronic control unit 32.

As noted above, in some embodiments, the electronic control unit 32 includes a network interface hardware 50. The network interface hardware 50 may include or be configured to interface with the transceiver 34 to connect to the network 28. As an example, the network interface hardware 50 is operable to communicate with any wired or wireless network hardware, including an antenna, a modem, a LAN, wireless fidelity (Wi-Fi) card, WiMAX card, mobile communications hardware, and/or other hardware for communicating with other networks and/or devices. From this connection, communication is made through the transceiver 34 using the network interface hardware 50 thereby facilitating communication between the electronic control unit 32 and the mobile computing device 30 through the network 28.

It should be understood that while the components discussed above are illustrated as residing within the electronic control unit 32, this is merely an example thereof. In some embodiments, one or more of the components may reside external to the electronic control unit 32. It should also be understood that while the electronic control unit 32 is illustrated as a single device, this is also merely an example. In some embodiments, the detection logic 46 and the communication logic 48 may reside on different computing devices. As an example thereof, one or more of the functionalities and/or components described herein may be provided by the mobile computing device 30, which may be coupled to the vehicle 12 through the network 28.

Referring now to FIGS. 2-9, the kinetic seat assembly 10 is schematically shown and generally includes a first lower component 52, a second lower component 54 pivotally connected to the first lower component 52, a first upper component 56, a second upper component 58 pivotally connected to the first upper component 56, a vertical damping mechanism 100, a lateral damping mechanism 102, and a linkage assembly 60. As discussed in more detail herein, the vertical damping mechanism 100 and the lateral damping mechanism 102 provide a damping effect between the second lower component 54 and the second upper component 58 relative to the first lower component 52 and the first upper component 56. As shown herein, the kinetic seat assembly 10 is depicted as a seat such as a vehicle seat. As such, the first lower component 52 may be referred to herein as a primary seat cushion frame 52, the second lower component 54 may be referred to herein as a secondary seat cushion frame 52, the first upper component 56 may be referred to herein as a primary seat back frame 56, and the second upper component 58 may be referred to herein as a secondary seat back frame 58. However, it should be appreciated that the disclosed concept, specifically, the vertical damping mechanism 100 and the lateral damping mechanism 102, is not limited to such embodiments being incorporated into a vehicle seat. Rather, the vertical damping mechanism 100 and the lateral damping mechanism 102 may provide a damping effect between any two fixed or movable components, such as those described in more detail herein.

As used herein, the term "damping effect" is referred to as a degree of compression. In embodiments, compression may be measured by a length of a biasing member, such as a spring, or resistance to compression by a fluid, such as oil. As such, a damping effect is directly correlated to an amount of travel between ends of the biasing member or resistance provided by the fluid.

As shown in FIGS. 3-5 and 20, the linkage assembly 60 interconnects the secondary seat cushion frame 54 and the secondary seat back frame 58. The linkage assembly 60 is configured to inhibit the secondary seat cushion frame 54 and the secondary seat back frame 58 from moving out of phase with one another. It is to be understood that movement of the secondary seat cushion frame 54 and the secondary seat back frame 58 is caused by rotation of the occupant seated within the kinetic seat assembly 10 due to a force exhibited on the occupant and the vehicle 12 during driving. Thus, it should be appreciated that the movement of the secondary seat cushion frame 54 and the secondary seat back frame 58 is not a result of any motorized or otherwise electronically programmed and controlled operation. However, as discussed in more detail herein, the degree of movement may be controlled by an electronic program or controlled operation. Various embodiments of the kinetic seat assembly 10 and the operation of the kinetic seat assembly 10 will be described in more detail herein.

It should be appreciated that, as shown in FIG. 1, the secondary seat cushion frame 54 includes padding 11 to support a pelvis, such as a buttocks and thighs, of an occupant, and that the secondary seat back frame 58 includes padding 13 to support a back of the occupant. The padding 11, 13 on the secondary seat cushion frame 54 and the secondary seat back frame 58 are omitted in the remaining figures to better illustrate the embodiments.

Figure 6:
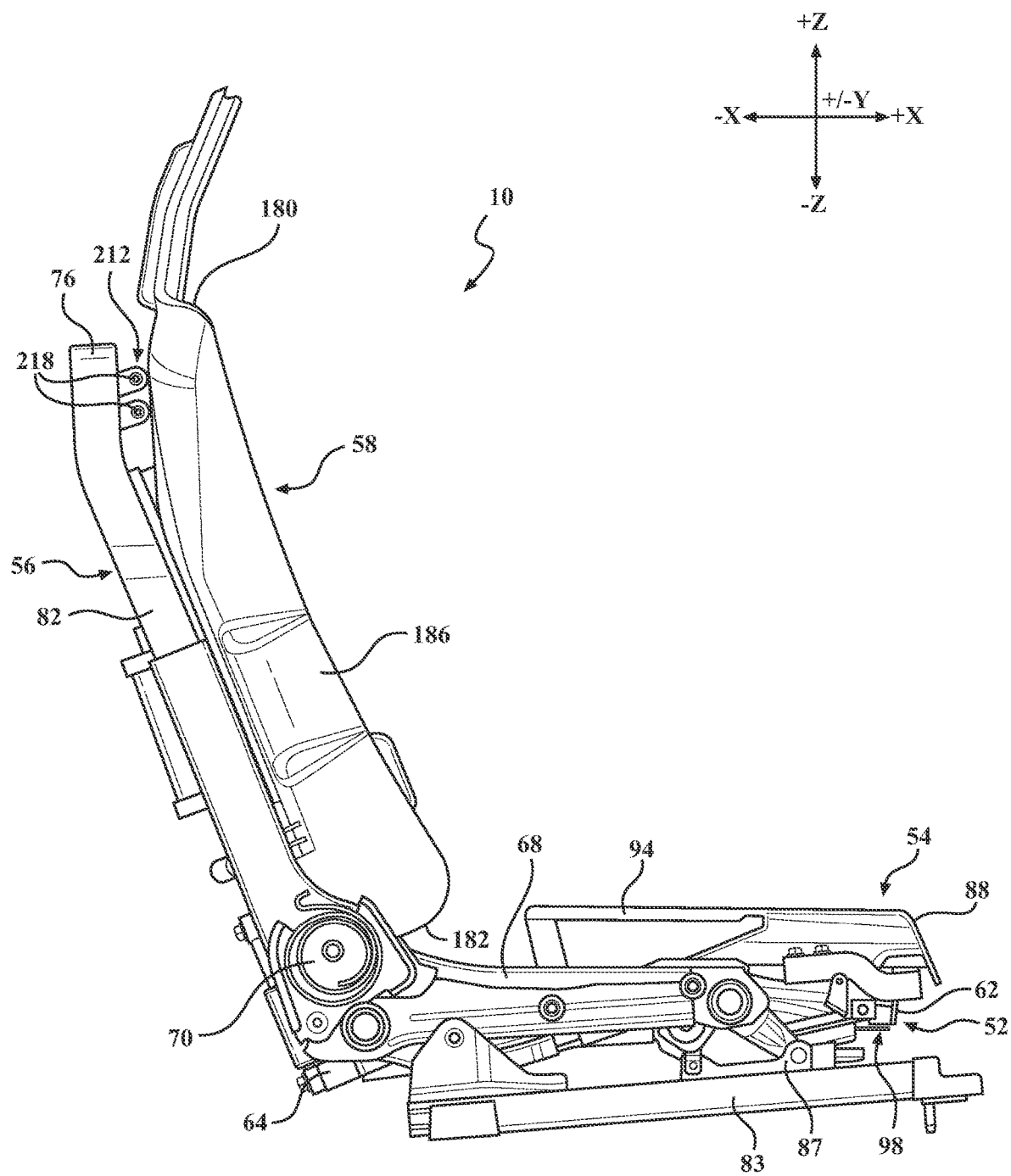
FIG. 6 schematically depicts a first side view of the kinetic seat assembly of FIG. 1, according to one or more embodiments shown and described herein.
Figure 7:
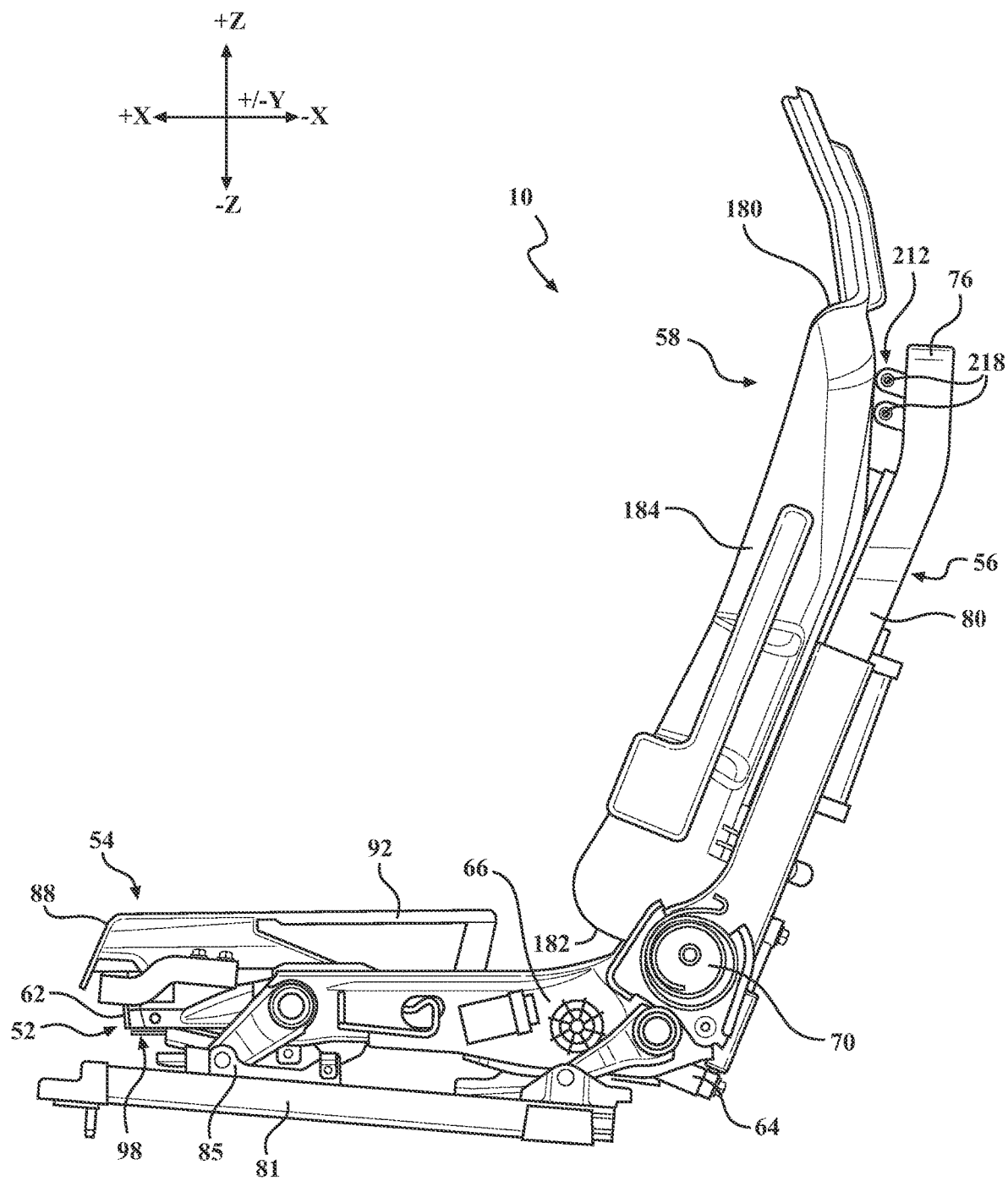
FIG. 7 schematically depicts a second side view of the kinetic seat assembly of FIG. 1, according to one or more embodiments shown and described herein.
Figure 9:
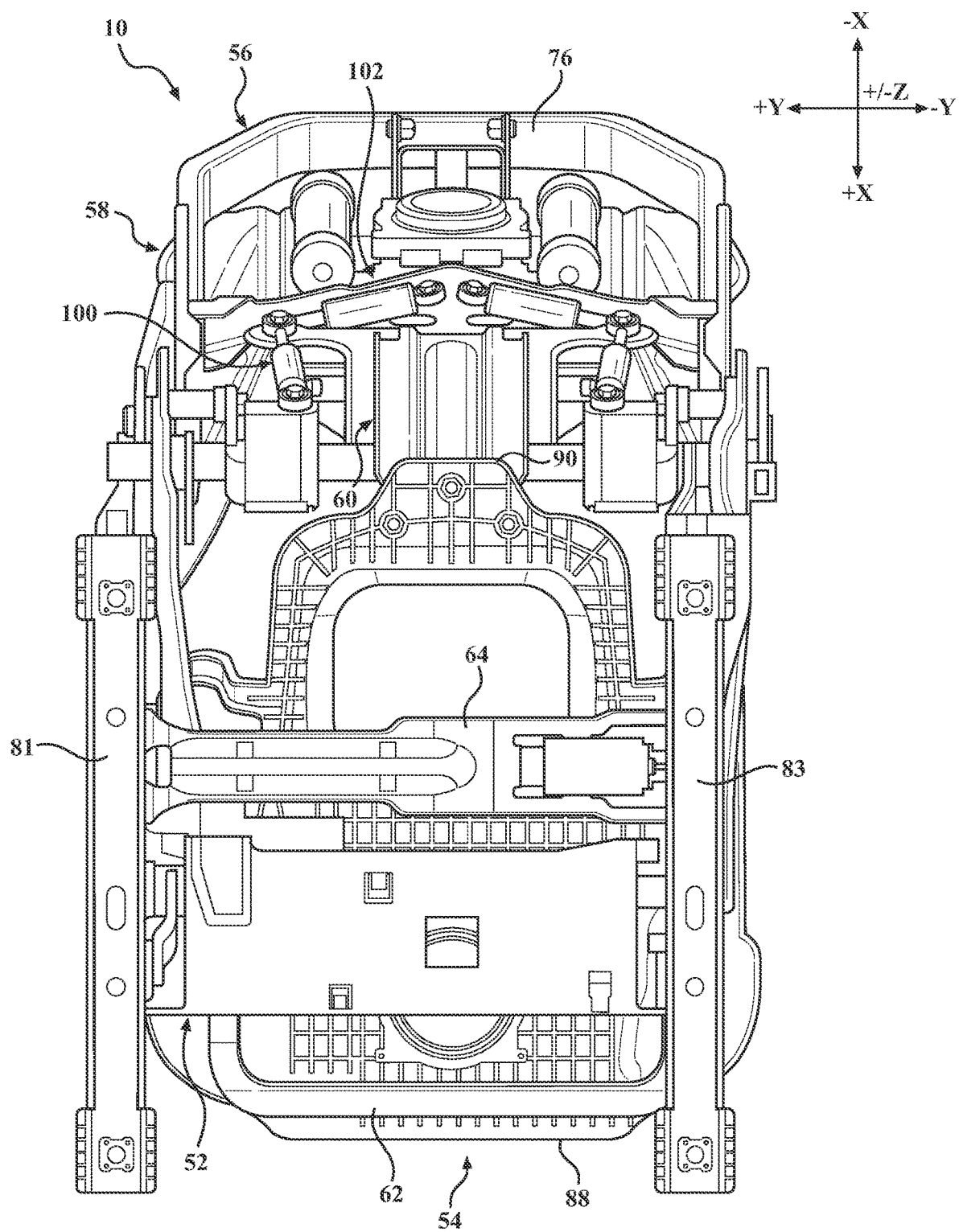
FIG. 9 schematically depicts a bottom view of the kinetic seat assembly of FIG. 1, according to one or more embodiments shown and described herein.
Figure 11:
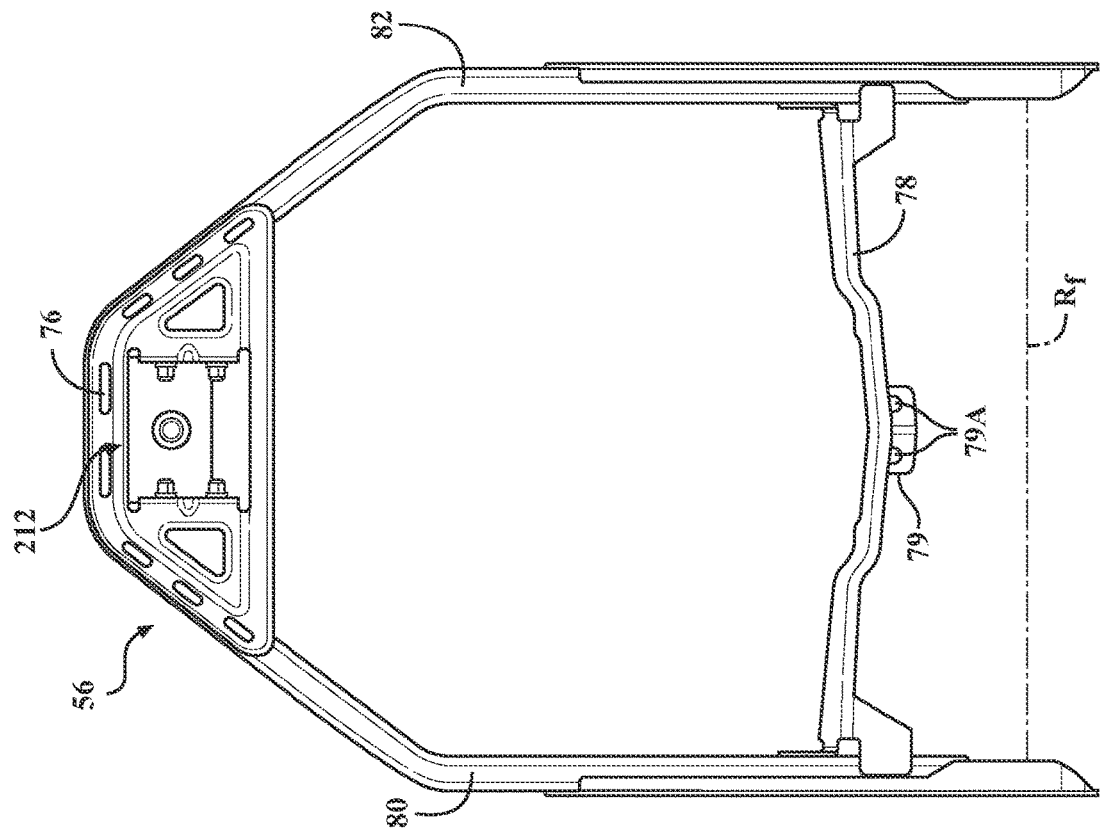
FIG. 11 schematically depicts a rear view of the primary seat back frame of FIG. 10, according to one or more embodiments shown and described herein.
Figure 10:
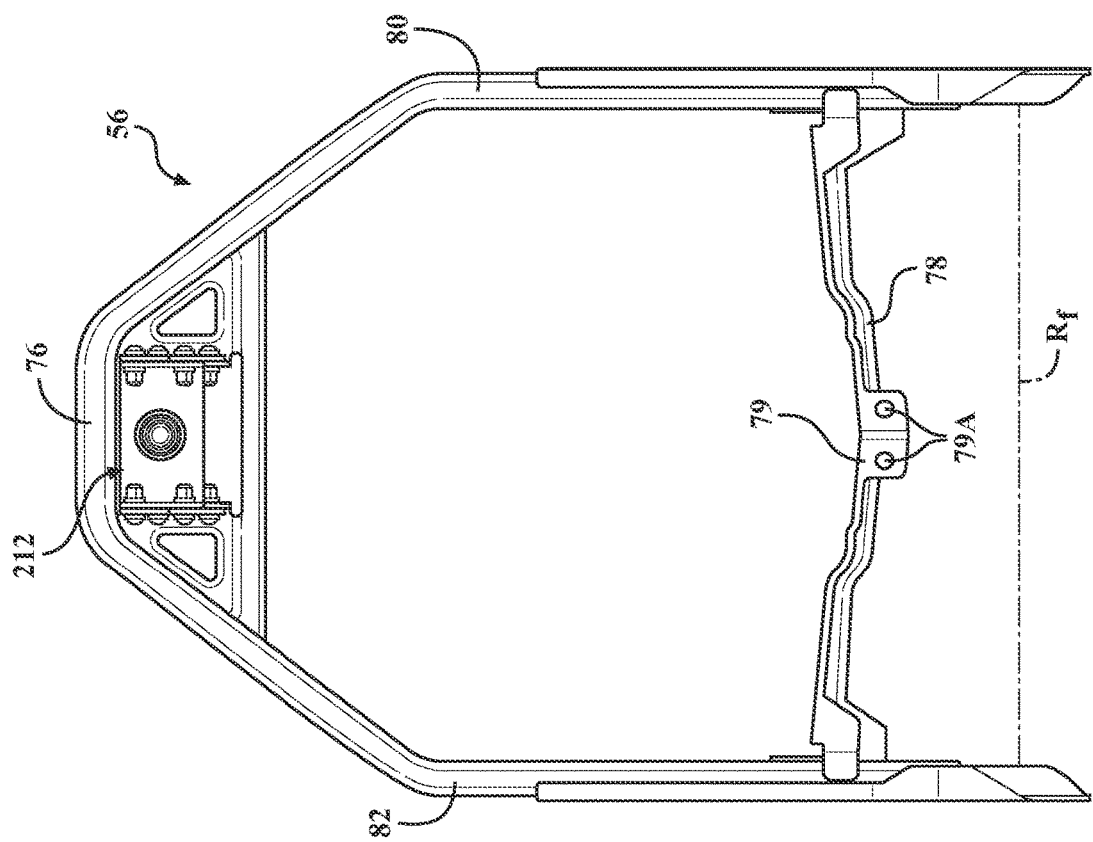
FIG. 10 schematically depicts a front view of a primary seat back frame of the kinetic seat assembly of FIG. 1, according to one or more embodiments shown and described herein.
Figure 12:
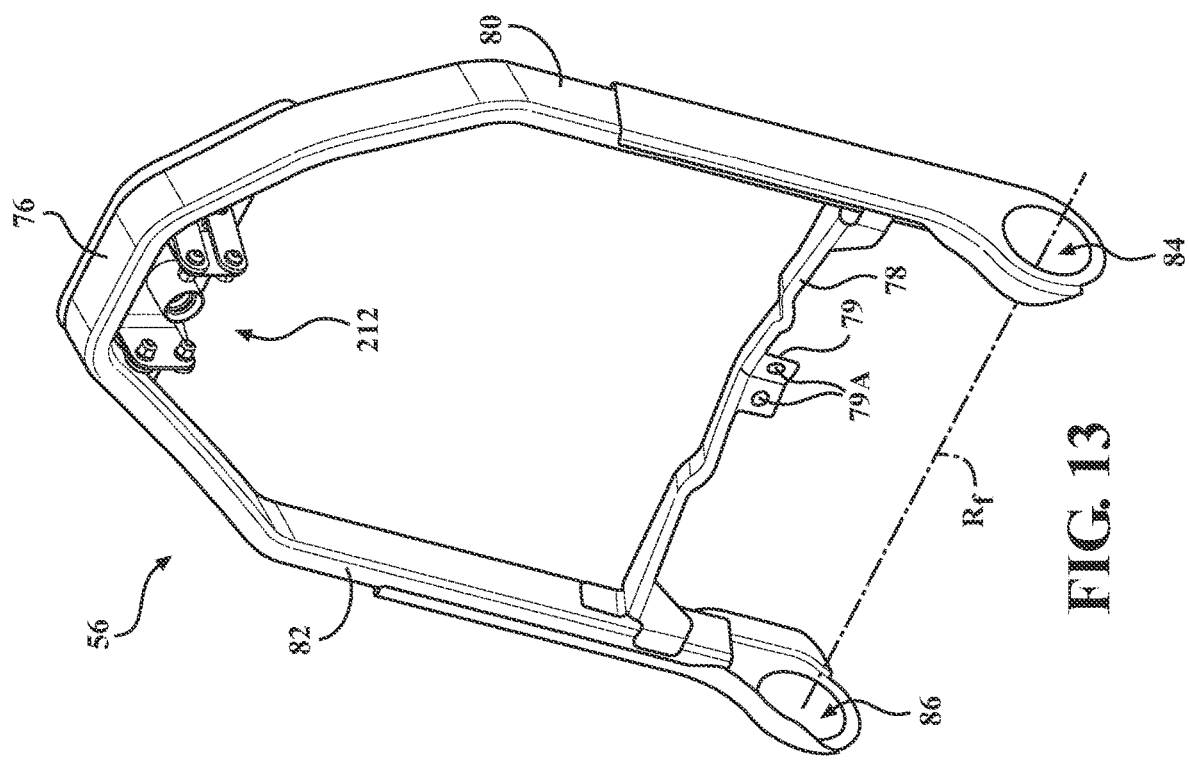
FIG. 12 schematically depicts a front perspective view of the primary seat back frame of FIG. 10, according to one or more embodiments shown and described herein.
Figure 13:
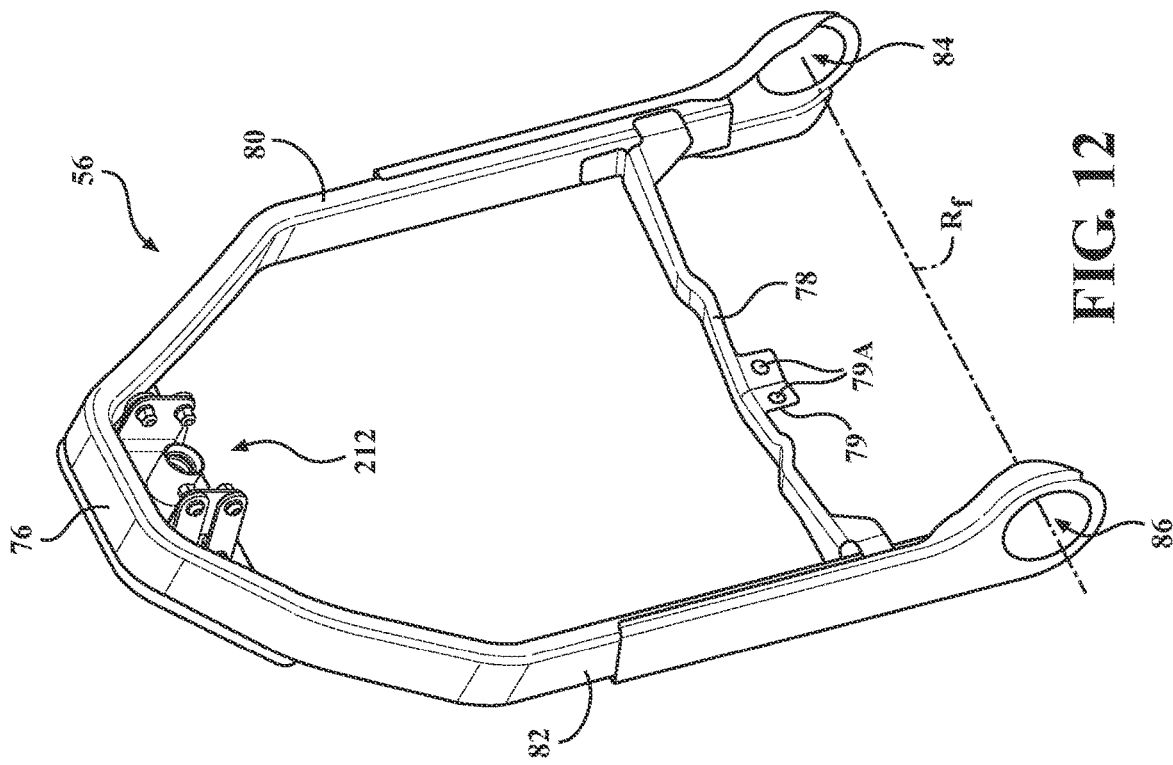
FIG. 13 schematically depicts another front perspective view of the primary seat back frame of FIG. 10, according to one or more embodiments shown and described herein.

Referring to FIGS. 6, 7, and 9, the primary seat cushion frame 52 may have a generally rectangular shape. The primary seat cushion frame 52 includes a front member 62 provided proximate a front portion thereof and a rear member 64 provided proximate a rear portion thereof. The rear member 64 traverses between a pair of opposing side members 66, 68. The primary seat cushion frame 52 may also include a pair of recliner mechanisms 70 provided on opposite sides of the primary seat cushion frame 52, proximate the rear member 64. The primary seat cushion frame 52 may include a pair of rails 81, 83 for slidably engaging a pair of tracks 85, 87 mounted to a floor F of the passenger compartment 14 of the vehicle 12. Sliding the pair of rails 81, 83 along the tracks 85, 87 allows the occupant to move the kinetic seat assembly 10 forward or backward in the vehicle longitudinal direction in order to comfortably position the kinetic seat assembly 10 and the occupant with respect to a steering wheel 20 of the vehicle 12.

Referring now to FIGS. 10-13, the primary seat back frame 56 may have a generally trapezoidal shape. The primary seat back frame 56 includes an upper member 76 provided proximate an upper portion thereof and a lower member 78 provided proximate a lower portion thereof. The lower member 78 traverses between a pair of opposing side members 80, 82. The lower member 78 includes a lower plate 79 extending therefrom. The lower plate 79 is provided at a substantially center location between the side members 80, 82. A pair of holes 79A are formed in the lower plate 79. As described in more detail herein, the pair of holes 79A are provided to facilitate coupling a lateral damping mechanism 102 to the primary seat back frame 56. The primary seat back frame 56 also includes a pair of openings 84, 86 formed in the side members 80, 82 of the primary seat back frame 56, proximate the lower member 78. The recliner mechanisms 70 in the primary seat cushion frame 52 engage the pair of openings 84, 86 formed in the primary seat back frame 56 in order to allow the primary seat back frame 56 to rotate about a reclining axis Rf with respect to the primary seat cushion frame 52.

In other embodiments of the kinetic seat assembly 10, the pair of openings 84, 86 are instead formed in the primary seat cushion frame 52 and the pair of recliner mechanisms 70 are provided on the primary seat back frame 56. In some embodiments, both the primary seat cushion frame 52 and the primary seat back frame 56 have mating recliner mechanisms, such as corresponding female and male recliner mechanisms, that engage with one another to facilitate rotation of the primary seat back frame 56 about the reclining axis Rf with respect to the primary seat cushion frame 52.

Figure 8:
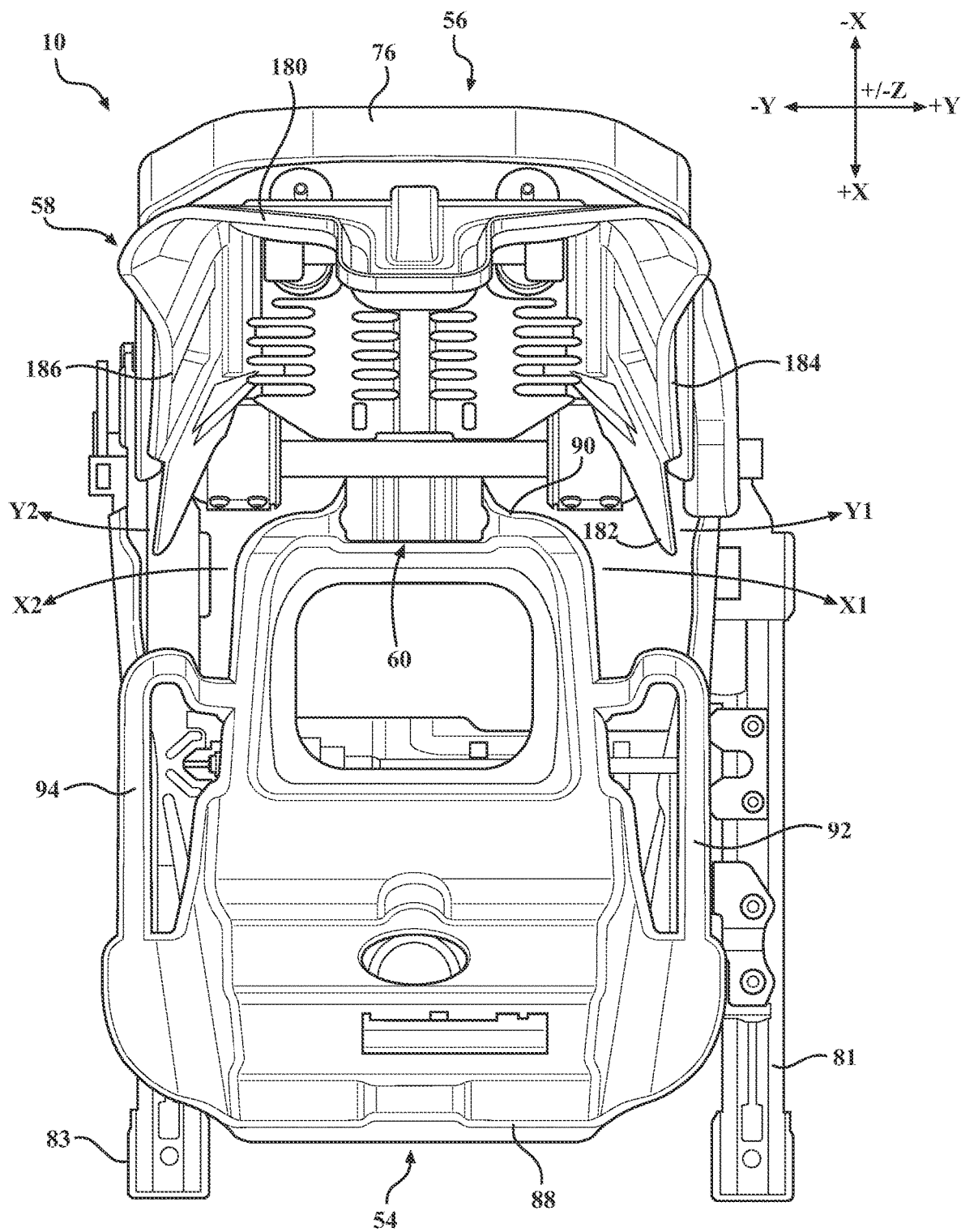
FIG. 8 schematically depicts a top view of the kinetic seat assembly of FIG. 1, according to one or more embodiments shown and described herein.

Referring now to FIG. 8, the secondary seat cushion frame 54 has a shape contoured to conform to the pelvis of the occupant to provide sufficient support when seated in the kinetic seat assembly 10. As such, the secondary seat cushion frame 54 includes a front end 88 provided proximate a front portion thereof, a rear end 90 provided proximate a rear portion thereof, and a pair of side ends 92, 94 interconnecting the front end 88 and the rear end 90.

As shown in FIGS. 6 and 7, the secondary seat cushion frame 54 is suspended above the primary seat cushion frame 52 at a front pivot mechanism 98 to facilitate pivoting and rotation of the secondary seat cushion frame 54 with respect to the primary seat cushion frame 52. More specifically, the front pivot mechanism 98 permits the secondary seat cushion frame 54 to rotate relative to the primary seat cushion frame 52 in a kinetic seat lateral direction as a force is applied in an opposite kinetic seat lateral direction to a person sitting in the kinetic seat assembly 10. The front pivot mechanism 98 is provided proximate the front portion of the secondary seat cushion frame 54 to facilitate the greatest degree of rotation. Thus, the front end 88 of the secondary seat cushion frame 54 is suspended above the front member 62 of the primary seat cushion frame 52 by the front pivot mechanism 98.

Figure 16:
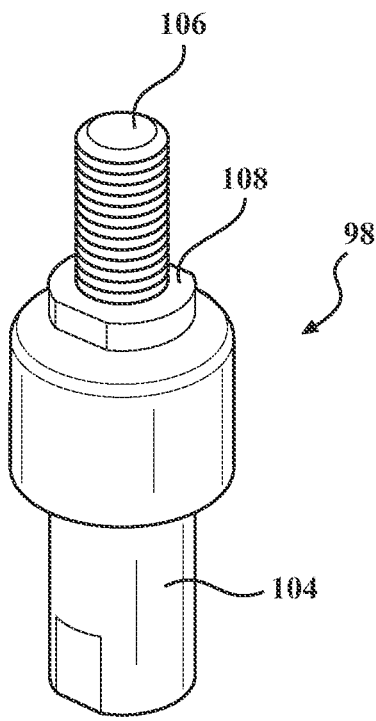
FIG. 16 schematically depicts a perspective view of a front pivot mechanism of the kinetic seat assembly of FIG. 1, according to one or more embodiments shown and described herein.

The front pivot mechanism 98 is disposed between the primary seat cushion frame 52 and the secondary seat cushion frame 54 proximate front portions thereof in order to suspend the secondary seat cushion frame 54 above the primary seat cushion frame 52. As shown in greater detail in FIG. 16, the front pivot mechanism 98 may include a lower front pivot mechanism portion 104 fixed to one of the primary seat cushion frame 52 and the secondary seat cushion frame 54 and an upper front pivot mechanism portion 106 fixed to the other of the primary seat cushion frame 52 and the secondary seat cushion frame 54. The upper front pivot mechanism portion 106 includes a ball joint 108 received within an end of the lower front pivot mechanism portion 104. In embodiments, the ball joint 108 may be provided on the lower front pivot mechanism portion 104, which is received within an end of the upper front pivot mechanism portion 106.

Figure 14:
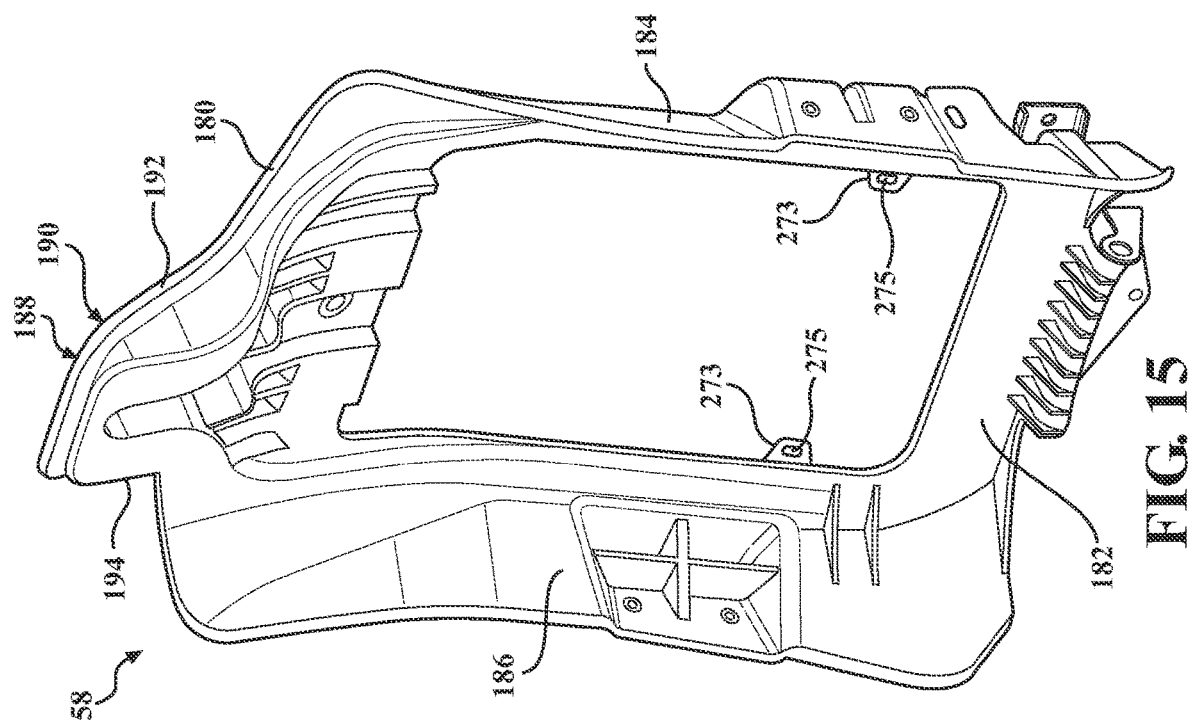
FIG. 14 schematically depicts a front perspective view of a secondary seat back frame of the kinetic seat assembly of FIG. 1, according to one or more embodiments shown and described herein.
Figure 15:
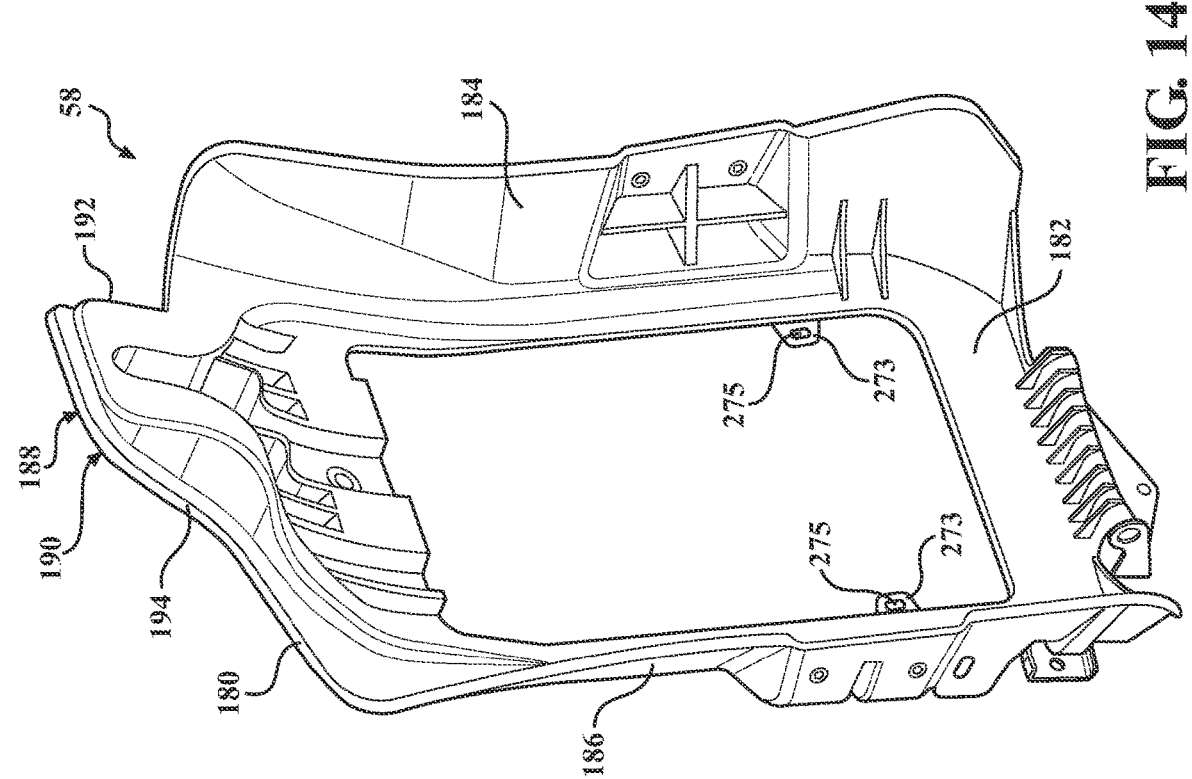
FIG. 15 schematically depicts another front perspective view of the secondary seat back frame of FIG. 14, according to one or more embodiments shown and described herein.

Referring to FIGS. 14 and 15 and with respect now to the secondary seat back frame 58, the secondary seat back frame 58 has a shape contoured to conform to the torso of the occupant to provide sufficient support. As such, the secondary seat back frame 58 includes an upper end 180 provided proximate an upper portion thereof, a lower end 182 provided proximate a lower portion thereof, and a pair of side ends 184, 186 interconnecting the upper end 180 and the lower end 182. As described in more detail herein, the secondary seat back frame 58 includes a pair of flanges 273 extending in a rearward kinetic seat longitudinal direction. A hole 275 is formed in each flange 273. The upper end 180 may include a head rest 188 integrally formed with and extending upwardly from the upper end 180 in order to provide additional support to the head and neck of the occupant. In some embodiments, a head support frame 190 is provided and extends upwardly from the side ends 184, 186 of the secondary seat back frame 58. The head support frame 190 is a generally inverted U-shaped member including a pair of arms 192, 194 connected to the side ends 184, 186 of the secondary seat back frame 58. As discussed in more detail below, an upper pivot mechanism 212 is coupled to the secondary seat back frame 58 below the head support frame 190.

Figure 17:
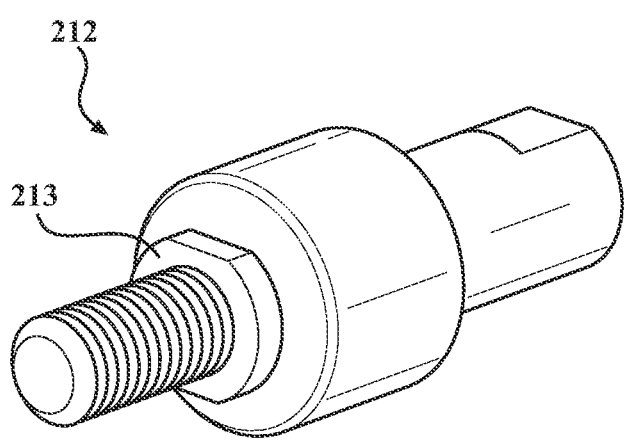
FIG. 17 schematically depicts a perspective view of an upper pivot mechanism of the kinetic seat assembly of FIG. 1, according to one or more embodiments shown and described herein.

As shown in FIGS. 6 and 7, the secondary seat back frame 58 is suspended in front of the primary seat back frame 56 at the upper pivot mechanism 212 to facilitate pivoting and rotation of the secondary seat back frame 58 with respect to the primary seat back frame 56. More specifically, the upper pivot mechanism 212 includes a ball joint 213 (FIG. 17) and one or more pivotable links 218 coupling the secondary seat back frame 58 to the primary seat back frame 56 to permit movement of the secondary seat back frame 58 relative to the primary seat back frame 56 in the kinetic seat vertical direction. The upper pivot mechanism 212 is positioned proximate the upper end 180 of the secondary seat back frame 58 to facilitate the greatest degree of rotation. Thus, the upper end 180 of the secondary seat back frame 58 is suspended in front of the upper member 76 of the primary seat back frame 56 by the upper pivot mechanism 212.

As noted above, and shown in FIGS. 3-5, the secondary seat cushion frame 54 and the secondary seat back frame 58 are connected to one another at the rear end 90 and the lower end 182, respectively, by the linkage assembly 60. The linkage assembly 60 ensures that the secondary seat cushion frame 54 and the secondary seat back frame 58 move in phase, i.e., in unison and in the same direction, with one another.

Figure 18:
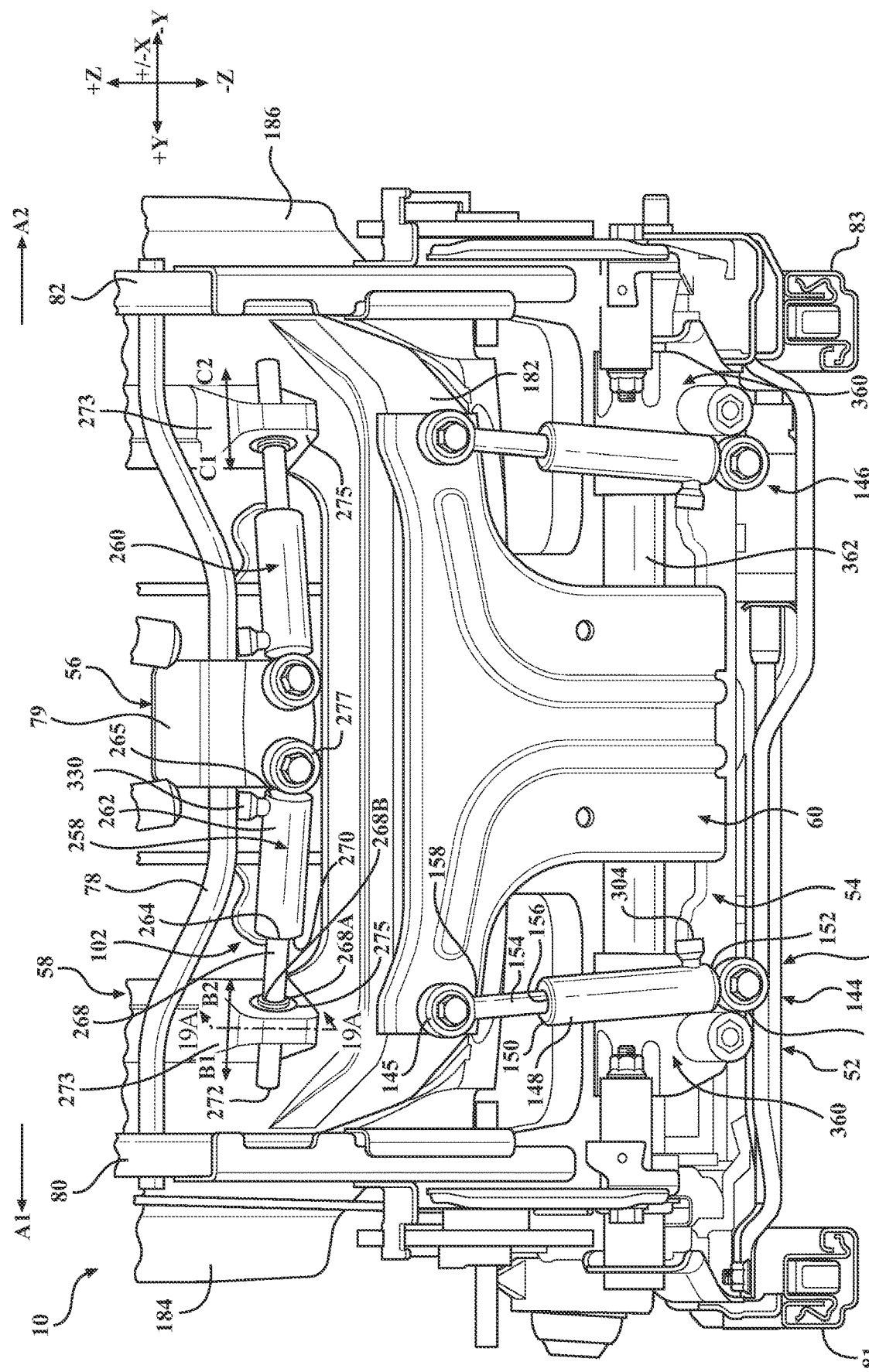
FIG. 18 schematically depicts a partial rear view of the kinetic seat assembly of FIG. 1, according to one or more embodiments shown and described herein.

Referring now to FIG. 18, the vertical damping mechanism 100 extends from the linkage assembly 60 to a pair of clamps 360 provided on a rear rod 362 extending between opposite rails 81, 83 of the primary seat cushion frame 52. The vertical damping mechanism 100 includes first and second vertical dampers 144, 146 interconnecting the primary seat cushion frame 52 and the secondary seat back frame 58 and the secondary seat cushion frame 54 due to the connection therebetween by the linkage assembly 60. As shown, a first or upper end of the vertical dampers 144, 146 is directly or indirectly attached or coupled to the secondary seat back frame 58 and an opposite second or lower end of the vertical dampers 144, 146 is indirectly or directly attached to the primary seat cushion frame 52. However, it should be appreciated, that the vertical dampers 144, 146 may extend between the secondary seat back frame 58 and the primary seat back frame 56.

It is to be understood that each vertical damper 144, 146 is identical in structure and operation and, thus, only the first vertical damper 144 will be described in detail and with reference to FIG. 18. In some embodiments, the first vertical damper 144 includes an outer tube 148 and an inner tube 154. The outer tube 148 includes a first end 150 and an opposite second end 152. As shown, the second end 152 is directly or indirectly coupled to the primary seat cushion frame 52. The inner tube 154 includes a first end 156 and an opposite second end 158. As shown, the second end 158 is directly or indirectly coupled to the linkage assembly 60. In some embodiments, the inner tube 154 and the outer tube 148 are permitted to rotate with respect to one another. Additionally, the inner tube 154 may extend and retract from the outer tube 148, but the inner tube 154 may be restricted from retracting completely out of the outer tube 148 such the first end 156 is retained inside the outer tube 148.

In some embodiments, as discussed in more detail below, the inner tube 154 slidably moves in and out of the first end 150 of the outer tube 148 in order to adjust the length of the first vertical damper 144 based on the movement of the secondary seat back frame 58 with respect to the primary seat cushion frame 52. In some embodiments, the first vertical damper 144 also includes a ball joint 145 at one or both ends of the first vertical damper 144 to provide necessary rotation of the first vertical damper 144 with respect to the primary seat cushion frame 52 and/or the secondary seat back frame 58. The ball joint 145 at the second end 152 of the outer tube 148 is directly or indirectly coupled to one of the primary seat cushion frame 52, specifically the clamp 360 provided on the rear rod 362 and the ball joint 145 at the second end 158 of the inner tube 154 is directly or indirectly coupled to the secondary seat back frame 58 such as by being rotatably coupled to the linkage assembly 60.

In some embodiments, the first vertical damper 144 may include a compressible or non-compressible fluid providing the damping effect between the inner tube 154 and the outer tube 148. The degree of the damping effect may be manually or electronically adjustable, as discussed in more detail herein. In other embodiments, the first vertical damper 144 includes a biasing member, such as a spring, for providing a damping effect between the inner tube 154 and the outer tube 148.

It is to be understood that variations of the first vertical damper 144 and the second vertical damper 146 may be contemplated and within the scope of the present disclosure. For example, in some embodiments, it is to be appreciated that the orientation of the outer tube 148 and the inner tube 154 may be switched such that the outer tube 148 is coupled to the secondary seat back frame 58 and the inner tube 154 is coupled to the primary seat cushion frame 52. In some embodiments, the first vertical damper 144 and the second vertical damper 146 include an inlet 304 for connecting to a reservoir of fluid, described in greater detail below.

Referring still to FIG. 18, the lateral damping mechanism 102 includes first and second lateral dampers 258, 260 interconnecting the primary seat back frame 56 and the secondary seat back frame 58. It is to be understood that each lateral damper 258, 260 is identical in structure and operation and, thus, only the first lateral damper 258 will be described in detail. In some embodiments, the first lateral damper 258 includes an outer tube 262 and an inner tube 268. The outer tube 262 includes a first end 264 and an opposite second end 265. The inner tube 268 includes a first end 270 and an opposite second end 272. In some embodiments, the inner tube 268 and the outer tube 262 are permitted to rotate with respect to one another. Additionally, the inner tube 268 may extend and retract from the outer tube 262, but the inner tube 268 may be restricted from retracting completely out of the outer tube 262 such that the first end 270 is retained inside the outer tube 262. A stopper 268A is formed on the inner tube 268. In embodiments, the stopper 268A is provided at a substantially medial position between the first end 270 and the second end 272 of the inner tube 268. In embodiments, the stopper 268A is a one-piece monolithic structure with the inner tube 268. In other embodiments, the stopper 268A is provided on the inner tube 268 and circumscribes the inner tube 268. In embodiments, the stopper 268A is an O-ring. The inner tube 268 of the first lateral damper 258 and the second lateral damper 260 each extend through a hole 275 of a respective flange 273 extending in a rearward direction from the secondary seat back frame 58.

Figure 19A:
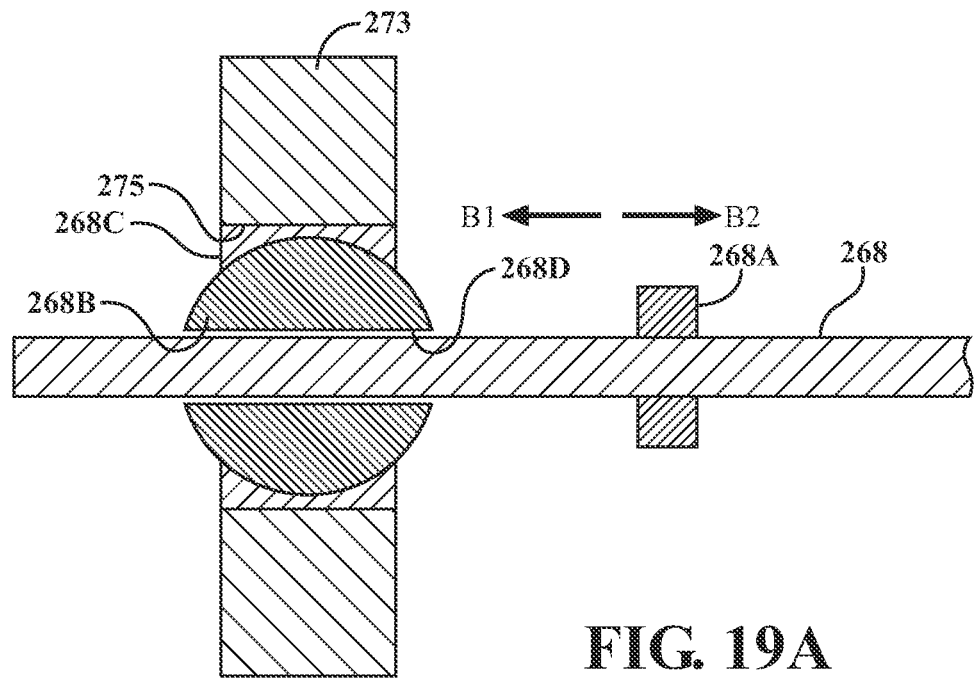
FIG. 19A schematically depicts a cross-section view taken along line 19A-19A of FIG. 18 illustrating a lateral damper of the secondary seat back frame in a first position relative to a flange of the primary seat back frame, according to one or more embodiments shown and described herein.
Figure 19B:
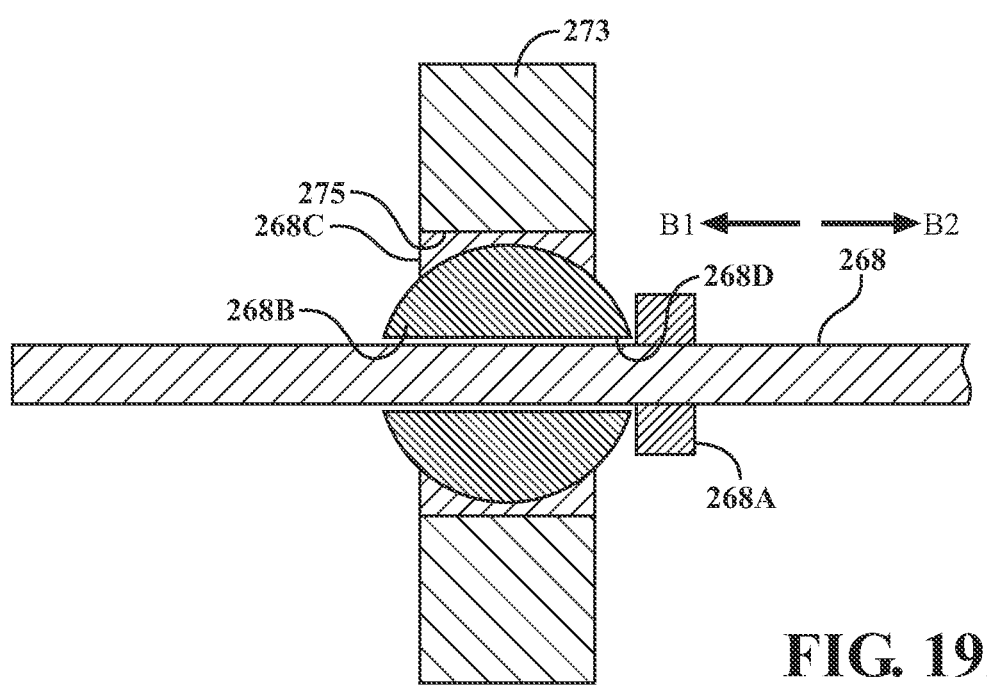
FIG. 19B schematically depicts a cross-section view of the lateral damper of the secondary seat back frame in a second position relative to a flange of the primary seat back frame, according to one or more embodiments shown and described herein.

Referring now to FIGS. 19A and 19B, a bearing 268B is provided within a bearing housing 268C fixed within the hole 275 formed in the flange 273. The bearing 268B is a segmented ball joint permitted to rotate within the bearing housing 268C. The inner tube 268 of the first lateral damper 258 has an outer diameter less than a diameter of a channel 268D formed in the bearing 268B. Accordingly, the inner tube 268 of the first lateral damper 258 is permitted to slide through the bearing 268B from a first position in which the stopper 268A is spaced apart from the flange 273, as shown in FIG. 19A, to a second position in which the stopper 268A prevents further extension of the first lateral damper 258, as shown in FIG. 19B. The stopper 268A has an outer diameter greater than the diameter of the channel 268D formed in the bearing 268B. Accordingly, the inner tube 268 of the first lateral damper 258 slides through the bearing 268B until the stopper 268A comes into contact with the bearing 268B to prevent further extension of the first lateral damper 258, as shown in FIG. 19B. It should be appreciated that, in other embodiments, further extension of the inner tube 268 through the bearing 268B is prevented by the stopper 268A coming into contact with some other surface such as, for example, the bearing housing 268C or the flange 273. In embodiments, the stopper 268A may include a bearing 268B that circumscribes an outer surface of the inner tube 268. Because the bearing 268B is permitted to rotate relative to the flange 273, the inner tube 268 is also permitted to pivot relative to the flange 273 as the secondary seat back frame 58 moves in the kinetic seat vertical direction.

Referring again to FIG. 18, in some embodiments, as discussed in more detail below, the inner tube 268 slidably moves in and out of the first end 264 of the outer tube 262 in order to adjust the length of the first lateral damper 258 based on the movement of the secondary seat back frame 58 with respect to the primary seat back frame 56. In some embodiments, the first lateral damper 258 includes a ball joint 277 at the second end 265 of the outer tube 262. The ball joint 277 is rotatably coupled to the lower member 78 of the primary seat back frame 56 to provide necessary rotation of the first lateral damper 258 with respect to the primary seat back frame 56. Specifically, the ball joint 277 is rotatably coupled to the lower plate 79 provided on the lower member 78 of the primary seat back frame 56. However, the second end 272 of the inner tube 268 is not fixedly connected to the secondary seat back frame 58.

Rather, the inner tube 268 is slidably movable through the hole 275 formed in the flange 273 as the secondary seat back frame 58 moves relative to the primary seat back frame 56.

As the secondary seat back frame 58 and the secondary seat cushion frame 54 move in the direction of arrow A1, the first lateral damper 258 moves in the direction of arrow B1 and the second lateral damper 260 moves in the direction of arrow C1. As the first lateral damper 258 moves in the direction of arrow B1, the stopper 268A abuts against the bearing 268B, or in embodiments the bearing housing 268C or the flange 273, and causes the inner tube 268 to compress within the outer tube 262, thereby causing a damping effect by the first lateral damper 258. As the secondary seat back frame 58 and the secondary seat cushion frame 54 move in the direction of arrow A1, the second lateral damper 260 moves in the direction of arrow C1. As the second lateral damper 260 moves in the direction of arrow C1, the inner tube 268 of the second lateral damper 260, which has an outer diameter less than the inner diameter of the hole 275 formed in the flange 273, is permitted to slide through the hole 275, thereby preventing any compression or tensioning of the second lateral damper 260 and an additional damping effect counteracting the damping effect provided by the first lateral damper 258.

Alternatively, as the secondary seat back frame 58 and the secondary seat cushion frame 54 move in the direction of arrow A2, the second lateral damper 260 moves in the direction of arrow C2 and the first lateral damper 258 moves in the direction of arrow B2. As the second lateral damper 260 moves in the direction of arrow C2, the stopper 268A of the second lateral damper 260 abuts against the bearing 268B, or in embodiments the bearing housing 268C or the flange 273, and causes the inner tube 268 to compress within the outer tube 262, thereby causing a damping effect by the second lateral damper 260. As the secondary seat back frame 58 and the secondary seat cushion frame 54 move in the direction of arrow A2, the first lateral damper 258 moves in the direction of arrow B2. As the first lateral dampers 258 moves in the direction of arrow B2, the inner tube 268 of the first lateral damper 258, which has an outer diameter less than the inner diameter of the hole 275 formed in the flange 273, is permitted to slide through the hole 275, thereby preventing any compression of the first lateral damper 258 and an additional damping effect counteracting the damping effect provided by the second lateral damper 260. Accordingly, it should be appreciated that only one of the first lateral damper 258 and the second lateral damper 260 provides a damping effect at any given time during movement of the secondary seat back frame 58 relative to the primary seat back frame 56.

In some embodiments, the first lateral damper 258 and the second lateral damper 260 may include a compressible or incompressible fluid providing the damping effect between the inner tube 268 and the outer tube 262. The degree of the damping effect may be manually or electronically adjustable, as discussed in more detail herein. In other embodiments, the first lateral damper 258 and the second lateral damper 260 include a biasing member, such as a spring, for providing a damping effect between the inner tube 268 and the outer tube 262. In some embodiments, the first lateral damper 258 and the second lateral damper 260 include an inlet 330 connected to a reservoir of fluid.

Figure 20:
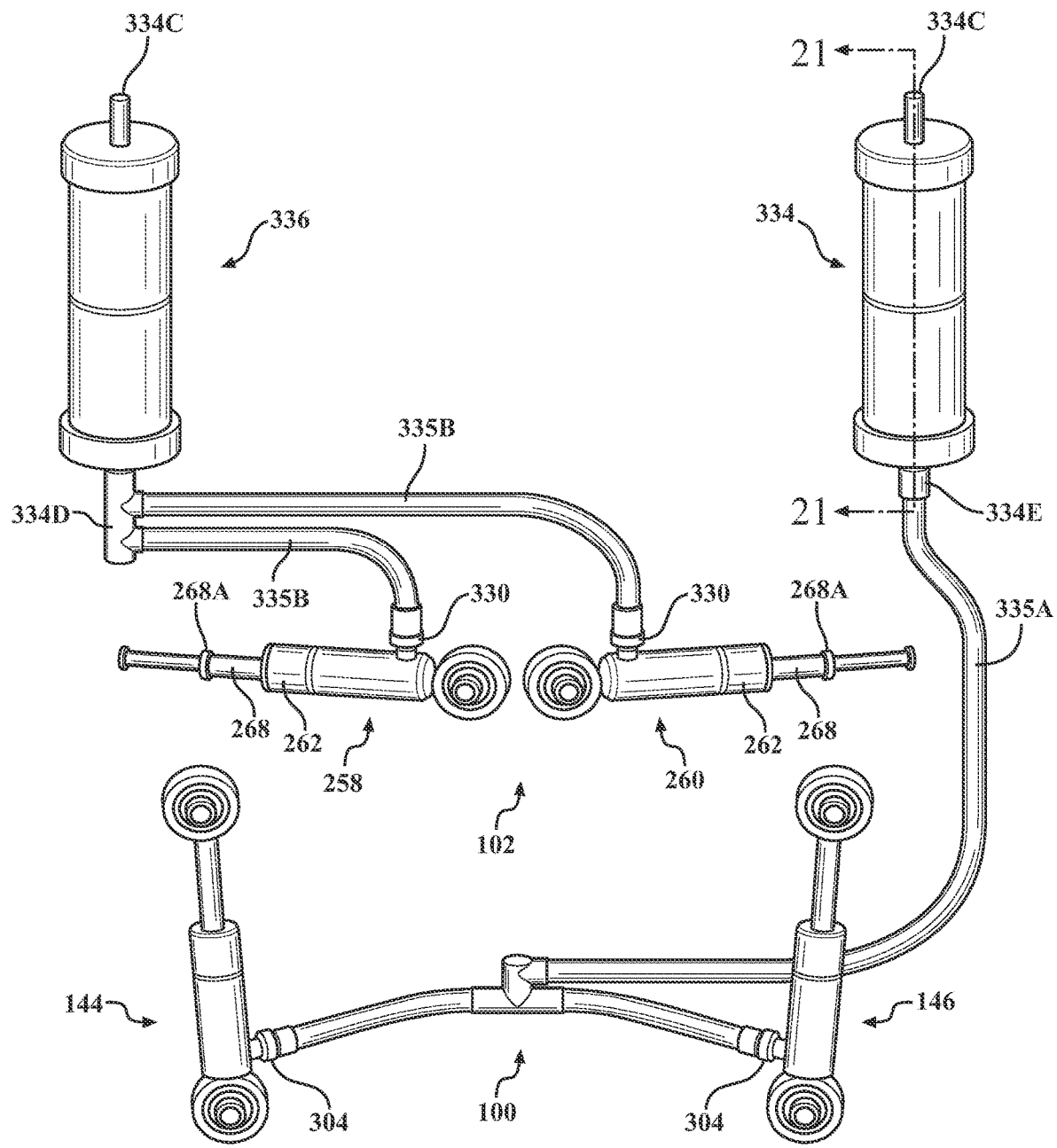
FIG. 20 schematically depicts an isolated view of a pair of fluid reservoirs in fluid communication with a pair of lateral damping mechanisms and a pair of vertical damping mechanisms of the kinetic seat assembly of FIG. 1, according to one or more embodiments shown and described herein.

Referring now to FIG. 20, the vertical damping mechanism 100 and the lateral damping mechanism 102 are shown apart from the other components of the kinetic seat assembly 10 and in fluid communication with a pair of fluid reservoirs. Specifically, a first fluid reservoir 334 is provided for delivering and receiving fluid to and from the vertical damping mechanism 100, specifically, the vertical dampers 144, 146. A second fluid reservoir 336 is provided for delivering and receiving fluid to and from the lateral damping mechanism 102, specifically, the lateral dampers 258, 260. In embodiments, the first fluid reservoir 334 may be provided for delivering fluid to and receiving fluid from the vertical dampers 144, 146 via one or more conduits 335A extending from an outlet 334E of the first fluid reservoir 334 to the inlet 304 of the vertical dampers 144, 146. Similarly, the second fluid reservoir 336 may be provided for delivering fluid to and receiving fluid from the lateral dampers 258, 260 via one or more conduits 335B extending from an outlet 334D of the second fluid reservoir 334 to the inlet 330 of the lateral dampers 258, 260.

The first fluid reservoir 334 and the second fluid reservoir 336 have identical structure and operate in the same manner. As such, only the structure of the first fluid reservoir 334 will be discussed in more detail herein. As shown in FIG. 20, the first fluid reservoir 334 includes an upper portion 334A including an air spring 334A1 and a lower portion 334B. A fluid, either a compressible fluid or a non-compressible fluid, is provided in the lower portion 334B. The first fluid reservoir 334 includes a piston 337 provided within the lower portion 334B and extending in a longitudinal direction within the first fluid reservoir 334. As described in more detail herein, movement of the piston 337 resulting from fluid flowing into the lower portion 334 increases pressure within the upper portion 334A. Similarly, movement of the piston 337 resulting from fluid flowing out of the lower portion 334B decreases pressure within the upper portion 334A The first fluid reservoir 334 includes an inlet 334C in fluid communication with an associated air pump 303 for delivering air into the upper portion 334A of the first fluid reservoir 334. The air pump 303 is in electronic communication with the electronic control unit 32 for controlling the amount of air delivered to the upper portion 334A of the first fluid reservoir 334 such that the upper portion acts as a pressure booster for the lower portion 334B containing the fluid. It should be appreciated that as the amount of air delivered by the air pump 303 is increased, the pressure within the first fluid reservoir 334 increases resulting in the air spring 334A1 within the upper portion 334A being actuated such that the force at which the fluid is delivered to the vertical dampers 144, 146 is also increased. Although not discussed in detail, it should be appreciated that the second fluid reservoir 336 operates in the same manner to control the force at which the fluid provided therein is delivered to the lateral dampers 258, 260.

The first fluid reservoir 334 includes a release valve 305 provided at the outlet 334D for controlling the amount of fluid permitted to enter and exit the first fluid reservoir 334. More specifically, the release valve 305 controls a size of an opening defined by the outlet 334D. The release valve 305 may be controlled either manually or, in embodiments, an actuator 307 may be provided for controlling a position of the release valve 305. In embodiments, the actuator 307 is communicatively coupled to the electronic control unit 32. The release valve 305 is operable between an open position, a closed position, and a plurality of intermediate positions between the open position and the closed position.

In embodiments, the first fluid reservoir 334 includes an air pressure gauge 340 for displaying or otherwise indicating an air pressure within the upper portion 334A of the first fluid reservoir 334. The air pressure gauge 340 may be any suitable display such as, for example, an analog gauge, a digital gauge, or the like. As shown, the air pressure gauge 340 is mounted to an upper end of the first fluid reservoir 334 proximate the inlet 334C. However, the air pressure gauge 340 may be provided at any suitable location for providing a visual display of the air pressure within the first fluid reservoir 334. The air pressure gauge 340 may be in communication with the electronic control unit 32 such that information determined by the air pressure gauge 340 may be transmitted to be displayed on the display unit 22 (FIG. 1).

The first fluid reservoir 334 may also include a minimum pressure valve 342 and a maximum pressure valve 344. The minimum pressure valve 342 and the maximum pressure valve 344 may be any suitable valve for regulating the pressure within the first fluid reservoir 334 such as, for example, a Schrader valve, a Presta valve, a Dunlop valve, and the like. The minimum pressure valve 342 may be operated to prevent the pressure within the upper portion 334A of the first fluid reservoir 334 from falling below a minimum air pressure threshold. The minimum pressure valve 342 may be controlled either manually or, in embodiments, an actuator 346 may be provided for controlling a position of the minimum pressure valve 342 and thus the minimum air pressure threshold. In embodiments, the actuator 346 is communicatively coupled to the electronic control unit 32.

Similarly, the maximum pressure valve 344 may be operated to prevent the pressure within the upper portion 334A of the first fluid reservoir 334 from exceeding a maximum air pressure threshold in response to the air pump 303 being operated. The maximum air pressure threshold is greater than the minimum air pressure threshold. More particularly, the maximum pressure valve 344 may function as a blowoff valve configured to release excess pressure when the pressure within the first fluid reservoir 334 exceeds the maximum air pressure threshold. The maximum pressure valve 344 may be controlled to either manually or, in embodiments, an actuator 348 may be provided for controlling a position of the maximum pressure valve 344 and thus the maximum air pressure threshold. In embodiments, the actuator 348 is communicatively coupled to the electronic control unit 32.

Although the minimum pressure valve 342 and the maximum pressure valve 344 are illustrated as being separate valves located at opposite ends of the upper portion 334A of the first fluid reservoir 334, it should be appreciated that the minimum pressure valve 342 and the maximum pressure valve 344 may be integrated into a single valve for limiting both a minimum pressure within the first fluid reservoir 334 as well as a maximum pressure within the first fluid reservoir 334.

Figure 21:
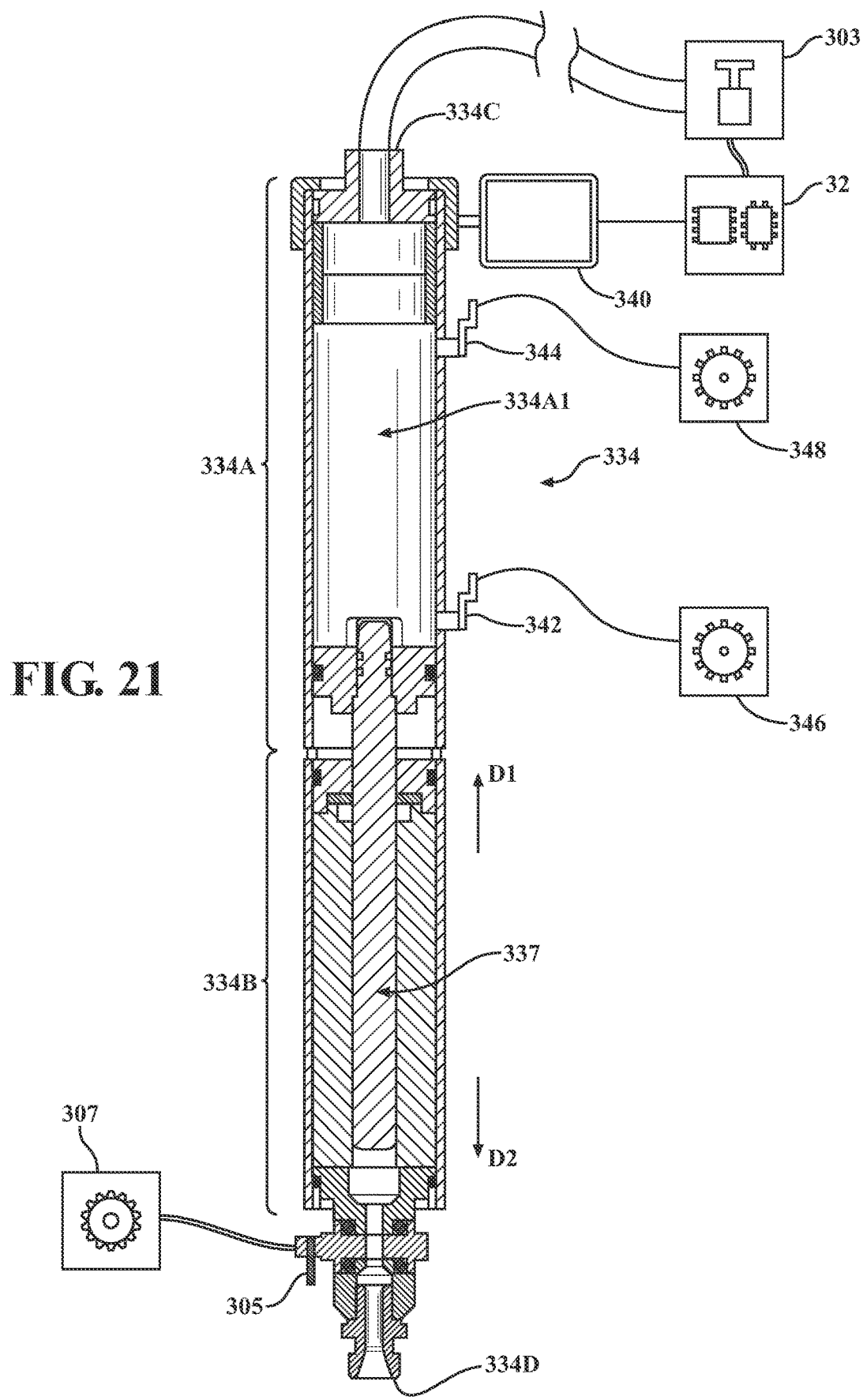
FIG. 21 schematically depicts a cross-section view of one of the fluid reservoirs of FIG. 20 taken along line 21-21 of FIG. 20, according to one or more embodiments shown and described herein.

Referring now to FIGS. 20 and 21, it should be appreciated that the air pressure within the upper portion 334A of the fluid reservoirs 334, 336 directly affects a speed at which the vertical dampers 144, 146 and the lateral dampers 258, 260 return to an uncompressed state from a compressed state. For example, when the air pressure within the upper portion 334A of the fluid reservoirs 334, 336 is increased, the speed at which the fluid flows from the lower portion 334B of the fluid reservoirs 334, 336 to the vertical dampers 144, 146 and the lateral dampers 258, 260 increases. Alternatively, when the air pressure within the upper portion 334A of the fluid reservoirs 334, 336 is decreased, the speed at which the fluid flows from the lower portion 334B of the fluid reservoirs 334, 336 to the vertical dampers 144, 146 and the lateral dampers 258, 260 decreases.

As the fluid flows from the lower portion 334B of the fluid reservoirs 334, 336 to the vertical dampers 144, 146 and the lateral dampers 258, 260, the piston 337 moves in the direction of arrow D1 and the air pressure within the upper portion 334 of the fluid reservoirs 334, 336 decreases. Alternatively, as the fluid flows from the vertical dampers 144, 146 and the lateral dampers 258, 260 back into the lower portion 334B of the fluid reservoirs 334, 336, the piston 337 moves in the direction of arrow D2 and the air pressure within the upper portion 334 of the fluid reservoirs 334, 336 increases.

It should be appreciated that the degree of opening of the release valve 305 directly affects a stiffness of the vertical dampers 144, 146 and the lateral dampers 258, 260. For example, as the release valve 305 moves toward the open position, i.e., the size of the opening of the release valve 305 increases, the stiffness of the vertical dampers 144, 146 and the lateral dampers 258, 260 decreases. Alternatively, as the release valve 305 moves toward the closed position, i.e., the size of the opening of the release valve 305 decreases, the stiffness of the vertical dampers 144, 146 and the lateral dampers 258, 260 increases. As such, when the opening of the release valve 305 is in the closed position, the stiffness of the vertical dampers 144, 146 and the lateral dampers 258, 260 is at its greatest such that the vertical dampers 144, 146 and the lateral dampers 258, 260 do not provide any damping effect.

It is appreciated that the air pump 303 and the release valve 305 associated with each fluid reservoir 334, 336, and more specifically the actuator 307 if provided, may be in communication with the electronic control unit 32 and operable via the user interface 24 (FIG. 1) for controlling the fluid permitted to flow from the fluid reservoirs 334, 336 to the vertical dampers 144, 146 and the lateral dampers 258, 260. As noted above, the display unit 22 (FIG. 1) may include the user interface 24 and may be located in any suitable location, such as on the dashboard of the vehicle 12, or otherwise within reach of the occupant such that the occupant may control the damping effect and the stiffness of the kinetic seat assembly 10. It is to be appreciated that the air pump 303 and the release valve 305 may each be operated, either by the electronic control unit 32 or user operation, in a first mode or position, such as a Sport mode. In the Sport mode, the air pump 303 may be operated in a first mode to provide a predetermined air pressure within the fluid reservoirs 334, 336 and the release valve 305 may be operated in a first position such that the opening of the outlet 334D is opened to a first predetermined degree of opening. As a result, the speed at which the vertical dampers 144, 146 and the lateral dampers 258, 260 return to the uncompressed state is increased and the stiffness of vertical dampers 144, 146 and the lateral dampers 258, 260 is decreased. This allows the secondary seat back frame 58 and the secondary seat cushion frame 54 to move more freely.

The air pump 303 and the release valve 305 may also be operated, either automatically by the electronic control unit 32 or user operation, in a second mode or position, such as a Comfort mode. In the Comfort mode, the air pump 303 may be operated in a second mode to provide a second predetermined air pressure within the fluid reservoirs 334, 336 less than the first predetermined air pressure, and the release valve 305 may be operated in a second position such that the opening of the outlet 334D is opened to a second predetermined degree of opening smaller than the first predetermined degree of opening. As a result, the speed at which the vertical dampers 144, 146 and the lateral dampers 258, 260 return to the uncompressed state is decreased and the stiffness of vertical dampers 144, 146 and the lateral dampers 258, 260 is increased. This allows the secondary seat back frame 58 and the secondary seat cushion frame 54 to remain in a more fixed position. In some embodiments, the Comfort mode may inhibit all movement between the secondary seat cushion frame 54 and the secondary seat back frame 58 relative to the primary seat cushion frame 52 and the primary seat back frame 56. It should be appreciated that the Sport mode and Comfort mode discussed herein function to adjust the operation of the air pump 303 and the release valve 305 simultaneously. However, it should be appreciated that the air pump 303 and the release valve 305 may also each be independently operated between the first mode or position, the second mode or position, and a plurality of intermediate modes or positions automatically by the electronic control unit 32 or by user operation.

In use, the occupant controls the turning direction of the vehicle 12 by rotating the steering wheel 20. In doing so, the turning direction side shoulder of the occupant moves downward relative to the counter-turning direction side shoulder, and the turning direction side shoulder moves rearward relative to the counter-turning direction side shoulder. At this time, a steering operation can be comfortably performed if the occupant bends the lumbar spine in the turning direction and shortens a distance between the turning direction side pelvis and the shoulder compared to a distance between the counter-turning direction side pelvis and the shoulder, twists the lumbar spine, and pivotally moves the pelvis in the same direction as the turning direction side shoulder.

When the occupant directs the vehicle 12 in a turning direction, a force is applied onto the vehicle 12 and, thus, the occupant in the counter-turning direction. In a standard vehicle seat not equipped with moving to compensate for this force and allow the occupant to adjust a pelvis or torso position, the occupant will exhibit strain on these joints, including the knees, waist, and shoulders. In a seat in which the seat cushion frame and the seat back frame rotate in opposite directions, this strain on the occupant's joints is magnified.

The present disclosure seeks to eliminate these joint stresses by permitting the occupant seated in the kinetic seat assembly 10 to rotate with the force exhibited on the vehicle 12 during a turn. Thus, the present kinetic seat assembly 10 allows the pelvis and the torso of the occupant to rotate in order to maintain a center of gravity within the vehicle 12 in the direction of the turn.

As the occupant turns the vehicle 12 to the right, the occupant lowers the right shoulder and uses the trunk muscle so as to bend the lumbar spine to the right. This causes the occupant to pivotally move the pelvis counterclockwise in the rolling direction and clockwise in the yaw direction. In addition, the occupant pivotally moved the torso counterclockwise in the rolling direction and clockwise in the yaw direction. During a turn to the right, force is applied onto the occupant to the left. This further facilitates rotation of the torso and pelvis of the occupant to the left due to the momentum of the vehicle 12. As such, the secondary seat cushion frame 54 and the secondary seat back frame 58 move in phase with one another to the left due to their connection by the linkage assembly 60. Specifically, as shown in FIG. 8, during a right turn operation, the rear end 90 of the secondary seat cushion frame 54 moves in a first seat cushion direction X1 and the lower end 182 of the secondary seat back frame 58 moves in a first seat back direction Y1. The first seat cushion direction X1 and the first seat back direction Y1 are each directed along the same kinetic seat lateral direction. Moreover, the first seat cushion direction X1 and the first seat back direction Y1 are directed along the same kinetic seat lateral direction as the direction of arrow A1 shown in FIG. 18. Accordingly, during a right turn as described herein, the first lateral damper 258 moves in the direction of arrow B1 and the second lateral damper 260 moves in the direction of arrow C1. As the secondary seat cushion frame 54 and the secondary seat back frame 58 move to the left, the lateral damping mechanism 102 provides a controlled damping effect to reduce the force at which the secondary seat cushion frame 54 and the secondary seat back frame 58 move to the left. Alternatively, as the occupant turns the vehicle 12 to the left, the secondary seat cushion frame 54 and the secondary seat back frame 58 move in phase with one another to the right. Specifically, as shown in FIG. 8, during a right turn operation, the rear end 90 of the secondary seat cushion frame 54 moves in a second seat cushion direction X2 opposite the first seat cushion direction X1 and the lower end 182 of the secondary seat back frame 58 moves in a second seat back direction Y2 opposite the first seat back direction Y1. The second seat cushion direction X2 and the second seat back direction Y2 are each directed along the same kinetic seat lateral direction. Moreover, the second seat cushion direction X2 and the second seat back direction Y2 are directed along the same kinetic seat lateral direction as the direction of arrow A2 shown in FIG. 18. Accordingly, during a left turn as described herein, the first lateral damper 258 moves in the direction of arrow B2 and the second lateral damper 260 moves in the direction of arrow C2. As the secondary seat cushion frame 54 and the secondary seat back frame 58 move to the right, the lateral damping mechanism 102 provides a controlled damping effect to reduce the force at which the secondary seat cushion frame 54 and the secondary seat back frame 58 move to the right.

Referring again to FIG. 1, an imaginary line L extends from the front pivot mechanism 98 to the upper pivot mechanism 212. With respect to an occupant seated in the kinetic seat assembly 10, the line L generally extends through the shoulders of the occupant and the knees of the occupant. Thus, during use of the kinetic seat assembly 10, when undergoing movement during a right turn or a left turn, the kinetic seat assembly 10 ensures that the shoulders of the occupant and the knees of the occupant remain generally aligned with one another while allowing the occupant's waist to move in respective left and right directions in accordance with the above disclosure.

From the above, it is to be appreciated that defined herein is a new and unique kinetic seat assembly in which a seat cushion frame and a seat back frame rotate in phase with one another during movement of a vehicle, such as a turn. In doing so, the driver of the vehicle, or other occupant when the kinetic vehicle seat replaces a seat of a vehicle other than the driver seat, experiences a more comfortable driving experience in which the occupant's torso and waist move together.

What is claimed is:
1. A kinetic seat assembly comprising:
a primary seat back frame;
a secondary seat back frame; and
a lateral damping mechanism including a first lateral damper and a second lateral damper, the first lateral damper and the second lateral damper extending between the primary seat back frame and the secondary seat back frame, a first end of the first lateral damper and the second lateral damper is rotatably fixed to the primary seat back frame and an opposite second end of the first lateral damper and the second lateral damper is permitted to move freely through a hole formed in a respective flange extending from the secondary seat back frame.

2. The kinetic seat assembly of claim 1, wherein:
the first lateral damper and the second lateral damper each comprises:
an outer tube;
an inner tube permitted to extend and retract from the outer tube to adjust a length of the first lateral damper and the second lateral damper based on movement of the secondary seat back frame relative to the primary seat back frame, the inner tube having an outer diameter less than a diameter of the hole formed in the respective flange; and
a stopper provided on the inner tube to inhibit the inner tube from passing through the hole formed in the respective flange when the stopper contacts the flange.

3. The kinetic seat assembly of claim 2, further comprising:
a bearing housing provided within the hole formed in the respective flange; and
a bearing provided within the bearing housing and defining a channel through which the inner tube slides, wherein the bearing is rotatable within the bearing housing to permit the inner tube to pivot relative to the respective flange.

4. The kinetic seat assembly of claim 2, wherein the first lateral damper and the second lateral damper each includes a compressible fluid providing a damping effect between the inner tube and the outer tube.

5. The kinetic seat assembly of claim 4, wherein the first lateral damper and the second lateral damper permit movement of the secondary seat back frame relative to the primary seat back frame in a lateral direction.

6. The kinetic seat assembly of claim 4, wherein the first lateral damper and the second lateral damper each includes an inlet for connecting to an air supply, wherein air is supplied to the first lateral damper and the second lateral damper to a predetermined amount to control a degree of damping between the primary seat back frame and the secondary seat back frame.

7. The kinetic seat assembly of claim 4, wherein only one of the first lateral damper and the second lateral damper provides a damping effect at any given time during movement of the secondary seat back frame relative to the primary seat back frame.

8. The kinetic seat assembly of claim 7, wherein in response to the secondary seat back frame moving in a first direction, the stopper abuts against a respective flange to cause the inner tube of the first lateral damper to compress into the outer tube of the first lateral damper to provide a damping effect, and the inner tube of the second lateral damper slides freely through the hole formed in a respective flange without compressing into the outer tube of the second lateral damper.

9. The kinetic seat assembly of claim 1, wherein the first lateral damper and the second lateral damper each includes a ball joint provided at the first end thereof for rotatably coupling the first lateral damper and the second lateral damper to a primary seat cushion frame.

10. The kinetic seat assembly of claim 1, wherein the primary seat back frame is a fixed seat back frame of a seat and the secondary seat back frame is a movable seat back frame of the seat.

11. A kinetic seat assembly comprising:
a primary seat cushion frame;
a secondary seat cushion frame movable relative to the primary seat cushion frame;
a primary seat back frame;
a secondary seat back frame movable relative to the primary seat back frame;
a pair of lateral dampers extending between the primary seat back frame and the secondary seat back frame; and
a first fluid reservoir for providing a fluid into the pair of lateral dampers, the first fluid reservoir operable to control a rate at which fluid is provided to and drawn out of the pair of lateral dampers to control a damping effect.

12. The kinetic seat assembly of claim 11, further comprising:
a pair of vertical dampers extending between the secondary seat back frame and the primary seat cushion frame; and
a second fluid reservoir in fluid communication with the pair of vertical dampers.

13. The kinetic seat assembly of claim 11, wherein:
each fluid reservoir comprises:
an upper portion including an air spring;
a lower portion containing the fluid; and
a piston movably provided within the lower portion and extending in a longitudinal direction of the fluid reservoir; and
fluid flowing in and out of the lower portion results in the piston moving in the longitudinal direction of the fluid reservoir and a pressure within the upper portion increasing and decreasing, respectively.

14. The kinetic seat assembly of claim 13, further comprising an air pump for delivering air into the upper portion of each of the pair of fluid reservoirs.

15. The kinetic seat assembly of claim 14, wherein each of the pair of fluid reservoirs includes an air pressure gauge for displaying a pressure within a respective fluid reservoir of the pair of fluid reservoirs.

16. The kinetic seat assembly of claim 14, wherein each of the pair of fluid reservoirs includes a minimum pressure valve for maintaining an air pressure within a respective fluid reservoir of the pair of fluid reservoirs above a minimum air pressure threshold.

17. The kinetic seat assembly of claim 16, wherein each of the pair of fluid reservoirs includes a maximum pressure valve for maintaining an air pressure within a respective fluid reservoir of the pair of fluid reservoirs below a maximum air pressure threshold greater than the minimum air pressure threshold.

18. The kinetic seat assembly of claim 14, wherein each fluid reservoir further comprises a release valve for controlling an amount of fluid permitted to enter and exit an outlet of a respective fluid reservoir.

19. The kinetic seat assembly of claim 18, wherein:
when the release valve is in a first position, the secondary seat cushion frame and the secondary seat back frame are inhibited from moving relative to the primary seat cushion frame and the primary seat back frame; and
when the release valve is in a second position, the secondary seat cushion frame and the secondary seat back frame move relative to the primary seat cushion frame and the primary seat back frame.

20. The kinetic seat assembly of claim 11, wherein the primary seat back frame is a fixed seat back frame of a seat, the secondary seat back frame is a movable seat back frame of the seat, the primary seat cushion frame is a fixed seat cushion frame of the seat, and the secondary seat cushion frame is a movable seat cushion frame of the seat.

21. The kinetic seat assembly of claim 18, further comprising:
an electronic control unit,
wherein the air pump is communicatively coupled to the electronic control unit for controlling the amount of air delivered to the upper portion of each of the fluid reservoirs,
wherein the release valve is communicatively coupled to the electronic control unit for controlling the release valve and adjusting an opening of the outlet.

22. A kinetic seat assembly comprising:
a primary seat cushion frame;
a secondary seat cushion frame pivotally coupled to the primary seat cushion frame;
a primary seat back frame;
a secondary seat back frame pivotally coupled to the primary seat back frame;
a pair of vertical dampers extending between the secondary seat back frame and the primary seat cushion frame; and
a fluid reservoir for providing a fluid into the pair of vertical dampers to control a rate at which fluid is provided to and drawn out of the pair of vertical dampers.

23. The kinetic seat assembly of claim 22, wherein:
the fluid reservoir comprises:
an upper portion including an air spring;
a lower portion containing the fluid; and
a piston movably provided within the lower portion and extending in a longitudinal direction of the fluid reservoir; and
fluid flowing in and out of the lower portion of the fluid reservoir results in the piston moving in the longitudinal direction of the fluid reservoir and a pressure within the upper portion of the fluid reservoir increasing and decreasing, respectively.

24. The kinetic seat assembly of claim 23, wherein the fluid reservoir includes an air pressure gauge for displaying a pressure within the fluid reservoir.

25. The kinetic seat assembly of claim 23, wherein the fluid reservoir includes a minimum pressure valve for maintaining an air pressure within the fluid reservoir above a minimum air pressure threshold.

26. The kinetic seat assembly of claim 25, wherein the fluid reservoir includes a maximum pressure valve for maintaining an air pressure within the respective fluid reservoir below a maximum air pressure threshold greater than the minimum air pressure threshold.

27. The kinetic seat assembly of claim 21, wherein the primary seat back frame is a fixed seat back frame of a seat of the vehicle, the secondary seat back frame is a movable seat back frame of the seat, the primary seat cushion frame is a fixed seat cushion frame of the seat, and the secondary seat cushion frame is a movable seat cushion frame of the seat.

\* \* \* \* \*

UNITED STATES PATENT AND TRADEMARK OFFICE
CERTIFICATE OF CORRECTION

PATENT NO. : 12,304,369 B2
APPLICATION NO. : 17/873703
DATED : May 20, 2025
INVENTOR(S) : Todd Rupert Muck et al.

Page 1 of 1

It is certified that error appears in the above-identified patent and that said Letters Patent is hereby corrected as shown below:

In the Specification

In Column 3, Line(s) 53, delete "general" and insert --generally--, therefor.

In Column 4, Line(s) 35, delete "object" and insert --objects--, therefor.

In Column 5, Line(s) 58, after "appreciated" delete "," therefor.

In Column 11, Line(s) 4, after "appreciated" delete "," therefor.

Signed and Sealed this
First Day of July, 2025

Coke Morgan Stewart
*Acting Director of the United States Patent and Trademark Office*